US012177010B2

(12) United States Patent
Zhang et al.

(10) Patent No.: US 12,177,010 B2
(45) Date of Patent: Dec. 24, 2024

(54) USER EQUIPMENT (UE) FILTER CAPABILITY SIGNALING

(71) Applicant: QUALCOMM Incorporated, San Diego, CA (US)

(72) Inventors: Qian Zhang, Basking Ridge, NJ (US); Yan Zhou, San Diego, CA (US); Peter Gaal, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 17/885,490

(22) Filed: Aug. 10, 2022

(65) Prior Publication Data

US 2024/0056216 A1 Feb. 15, 2024

(51) Int. Cl.
*H04L 1/00* (2006.01)
*H04L 5/14* (2006.01)

(52) U.S. Cl.
CPC .......... *H04L 1/0025* (2013.01); *H04L 1/0018* (2013.01); *H04L 5/14* (2013.01)

(58) Field of Classification Search
CPC ........ H04L 1/0025; H04L 1/0018; H04L 5/14
See application file for complete search history.

(56) References Cited

U.S. PATENT DOCUMENTS 9,578,681 B2 * 2/2017 Kenney ............... H04W 52/028
10,470,200 B2 * 11/2019 Gheorghiu ............ H04L 5/0053
2015/0271870 A1 * 9/2015 Agiwal ................. H04W 76/14
 370/311
2021/0135833 A1 * 5/2021 Hao ...................... H04B 1/0064
2021/0258133 A1 * 8/2021 Raghavan ........... H04W 72/044
2021/0360670 A1 11/2021 Huang et al.
2023/0076156 A1 * 3/2023 Abotabl .................. H04K 1/02
2023/0413037 A1 * 12/2023 Manolakos .......... H04B 7/0689

FOREIGN PATENT DOCUMENTS

WO 2021243287 A1 12/2021

OTHER PUBLICATIONS

International Search Report and Written Opinion—PCT/US2023/071033—ISA/EPO—Nov. 2, 2023.
Moderator (CATT): "Summary #1 of [109-e-R18-Duplex-03] Email Discussion on Subband Non-overlapping Full Duplex", 3GPP TSG RAN WG1 #109-e, R1-2205361, Mobile Competence Centre, 650, Route Des Lucioles, F-06921 Sophia-Antipolis Cedex, France, Vol. RAN WG1 1 No. e-Meeting, May 9, 2022-May 20, 2022, May 17, 2022, 69 Pages, XP052204180, p. 36-p. 41, Figures 3-3-3-6, 6.1.

* cited by examiner

*Primary Examiner* — Bailor C Hsu
(74) *Attorney, Agent, or Firm* — Arent Fox, LLP

(57) ABSTRACT

Aspects of the present disclosure include methods, apparatuses, and computer-readable medium for transmitting at least one capability signal to a network entity, wherein the at least one capability signal indicates whether at least one filter in at least one receive chain of the UE is adaptively switchable between a first configuration and a second configuration, wherein the first configuration supports half-duplex communication with the network entity, wherein the second configuration supports sub-band full duplex communication with the network entity; and exchanging a signal between the UE and the network entity according to the at least one capability signal.

30 Claims, 12 Drawing Sheets

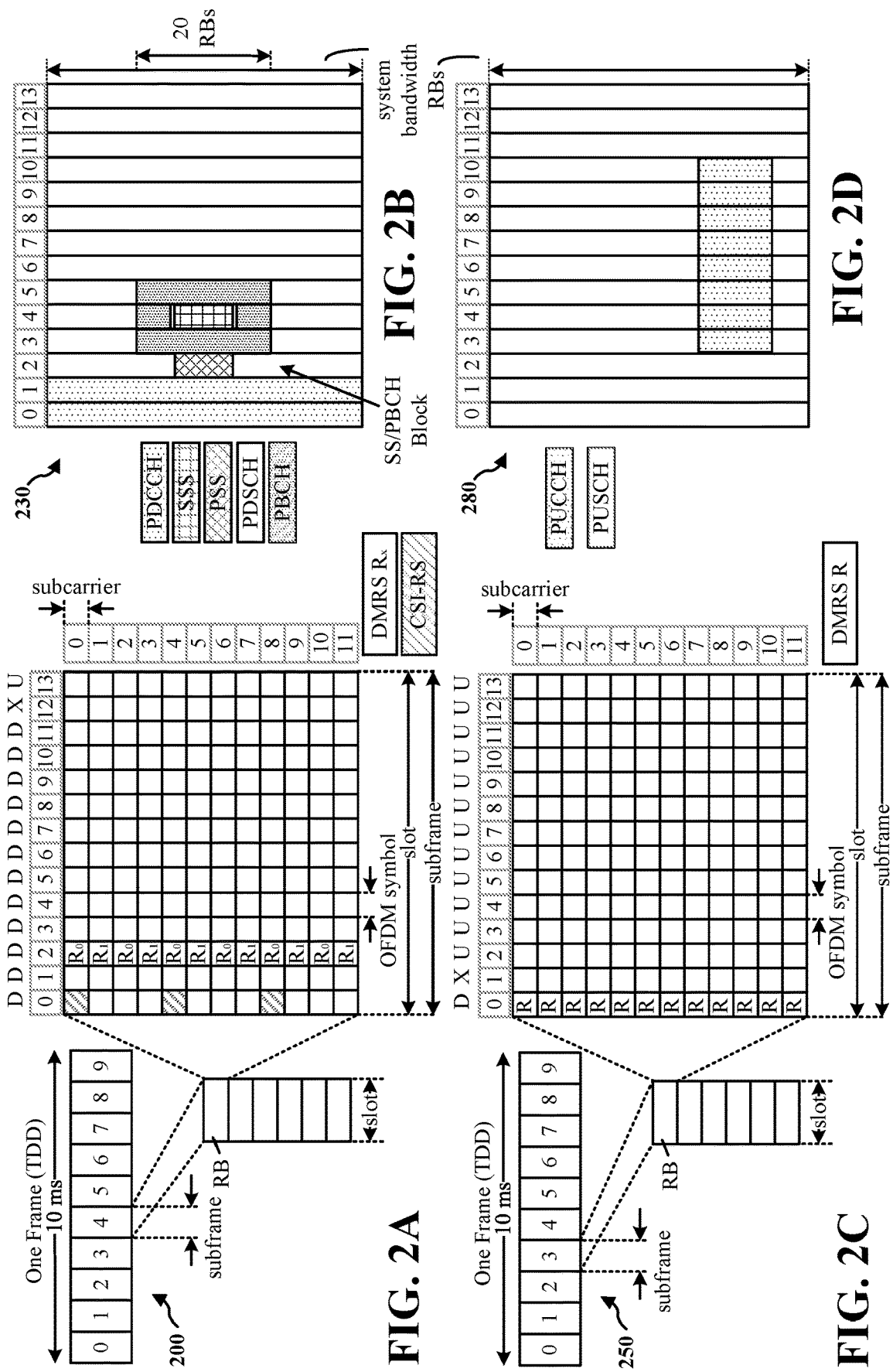

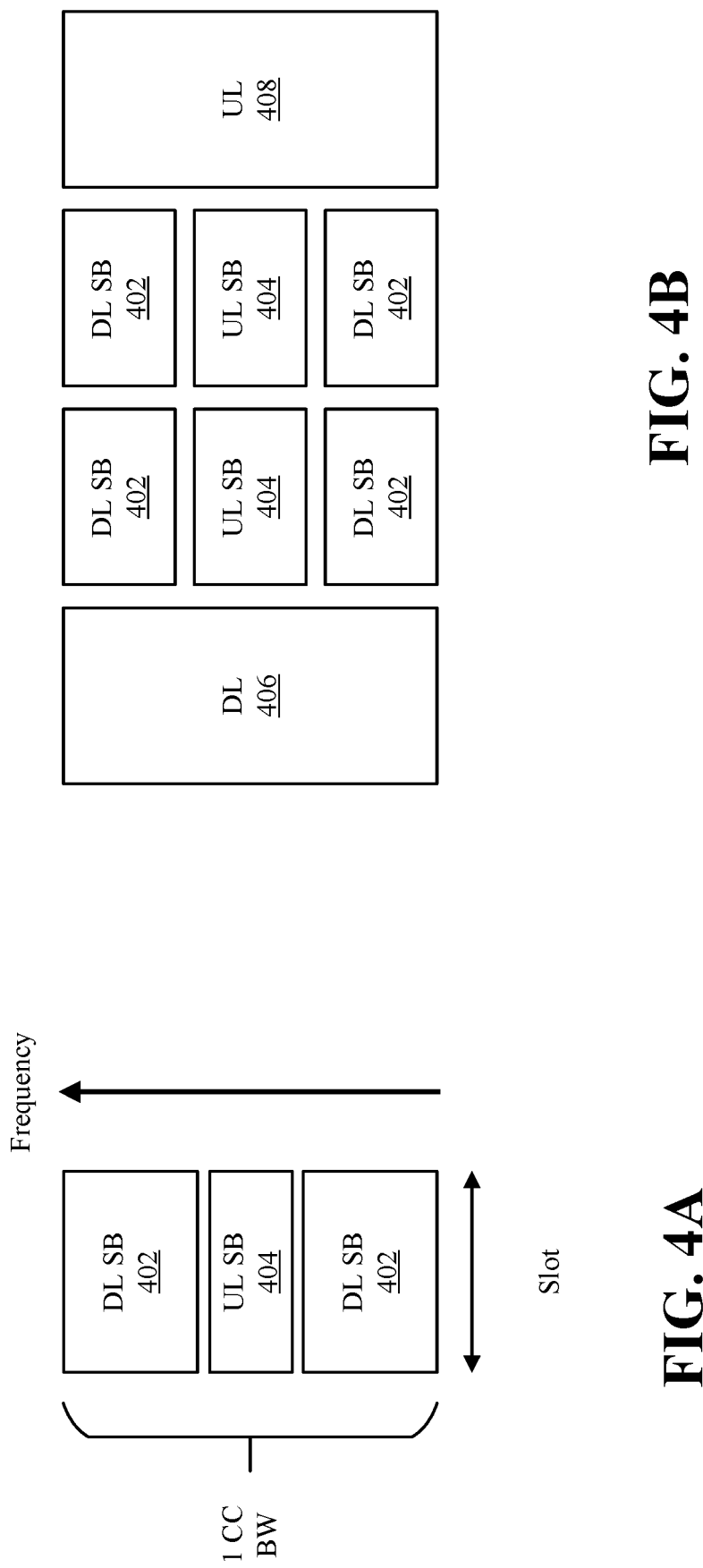

USER EQUIPMENT (UE) FILTER CAPABILITY SIGNALING

BACKGROUND

The present disclosure relates generally to wireless communication systems, and more particularly, to techniques for user equipment (UE) capability signaling in wireless communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method of wireless communication by a user equipment (UE). The method includes transmitting at least one capability signal to a network entity, wherein the at least one capability signal indicates whether at least one filter in at least one receive chain of the UE is adaptively switchable between a first configuration and a second configuration, wherein the first configuration supports half-duplex communication with the network entity, wherein the second configuration supports sub-band full duplex communication with the network entity. The method further includes exchanging a signal between the UE and the network entity according to the at least one capability signal.

Another example aspect includes a user equipment (UE) comprising a memory storing instructions; and at least one processor coupled with the memory. The at least one processor is configured to execute the instructions to transmit at least one capability signal to a network entity, wherein the at least one capability signal indicates whether at least one filter in at least one receive chain of the UE is adaptively switchable between a first configuration and a second configuration, wherein the first configuration supports half-duplex communication with the network entity, wherein the second configuration supports sub-band full duplex communication with the network entity. The at least one processor is further configured to execute the instructions to exchange a signal between the UE and the network entity according to the at least one capability signal.

Another example aspect includes a computer-readable medium having instructions stored thereon. The instructions, when executed by a processor, cause the processor to transmit at least one capability signal to a network entity, wherein the at least one capability signal indicates whether at least one filter in at least one receive chain of the UE is adaptively switchable between a first configuration and a second configuration, wherein the first configuration supports half-duplex communication with the network entity, wherein the second configuration supports sub-band full duplex communication with the network entity. The instructions, when executed by the processor, further cause the processor to exchange a signal between the UE and the network entity according to the at least one capability signal.

Another example aspect includes an apparatus comprising means for transmitting at least one capability signal to a network entity, wherein the at least one capability signal indicates whether at least one filter in at least one receive chain of the UE is adaptively switchable between a first configuration and a second configuration, wherein the first configuration supports half-duplex communication with the network entity, wherein the second configuration supports sub-band full duplex communication with the network entity. The apparatus further includes means for exchanging a signal between the UE and the network entity according to the at least one capability signal.

Another example aspect includes a method of wireless communication by a network entity. The method includes receiving at least one capability signal from a user equipment (UE), wherein the at least one capability signal indicates whether at least one filter in at least one receive chain of the UE is adaptively switchable between a first configuration and a second configuration, wherein the first configuration supports half-duplex communication with the UE, wherein the second configuration supports sub-band full duplex communication with the UE. The method further includes exchanging a signal between the UE and the network entity according to the at least one capability signal.

Another example aspect includes a network entity comprising a memory storing instructions; and at least one processor coupled with the memory. The at least one processor is configured to execute the instructions to receive at least one capability signal from a user equipment (UE), wherein the at least one capability signal indicates whether at least one filter in at least one receive chain of the UE is adaptively switchable between a first configuration and a second configuration, wherein the first configuration supports half-duplex communication with the UE, wherein the second configuration supports sub-band full duplex communication with the UE. The at least one processor is further configured to execute the instructions to exchange a signal between the UE and the network entity according to the at least one capability signal.

Another example aspect includes a computer-readable medium having instructions stored thereon. The instructions, when executed by a processor, cause the processor to receive at least one capability signal from a user equipment (UE), wherein the at least one capability signal indicates whether at least one filter in at least one receive chain of the UE is adaptively switchable between a first configuration and a second configuration, wherein the first configuration supports half-duplex communication with the UE, wherein the second configuration supports sub-band full duplex communication with the UE. The instructions, when executed by the processor, further cause the processor to exchange a signal between the UE and the network entity according to the at least one capability signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame for use in communication by the base stations and/or the UEs in FIG. 1, according to some aspects of the present disclosure.

FIG. 2B is a diagram illustrating an example of DL channels within a 5G/NR subframe for use in communication by the base stations and/or the UEs in FIG. 1, according to some aspects of the present disclosure.

FIG. 2C is a diagram illustrating an example of a second 5G/NR frame for use in communication by the base stations and/or the UEs in FIG. 1, according to some aspects of the present disclosure.

FIG. 2D is a diagram illustrating an example of UL channels within a 5G/NR subframe for use in communication by the base stations and/or the UEs in FIG. 1, according to some aspects of the present disclosure.

FIG. 4A is a first example configuration of a component carrier (CC) bandwidth over one slot, according to some aspects of the present disclosure.

FIG. 4B is a second example configuration of a CC bandwidth over multiple slots, according to some aspects of the present disclosure.

DETAILED DESCRIPTION

Figure 1:
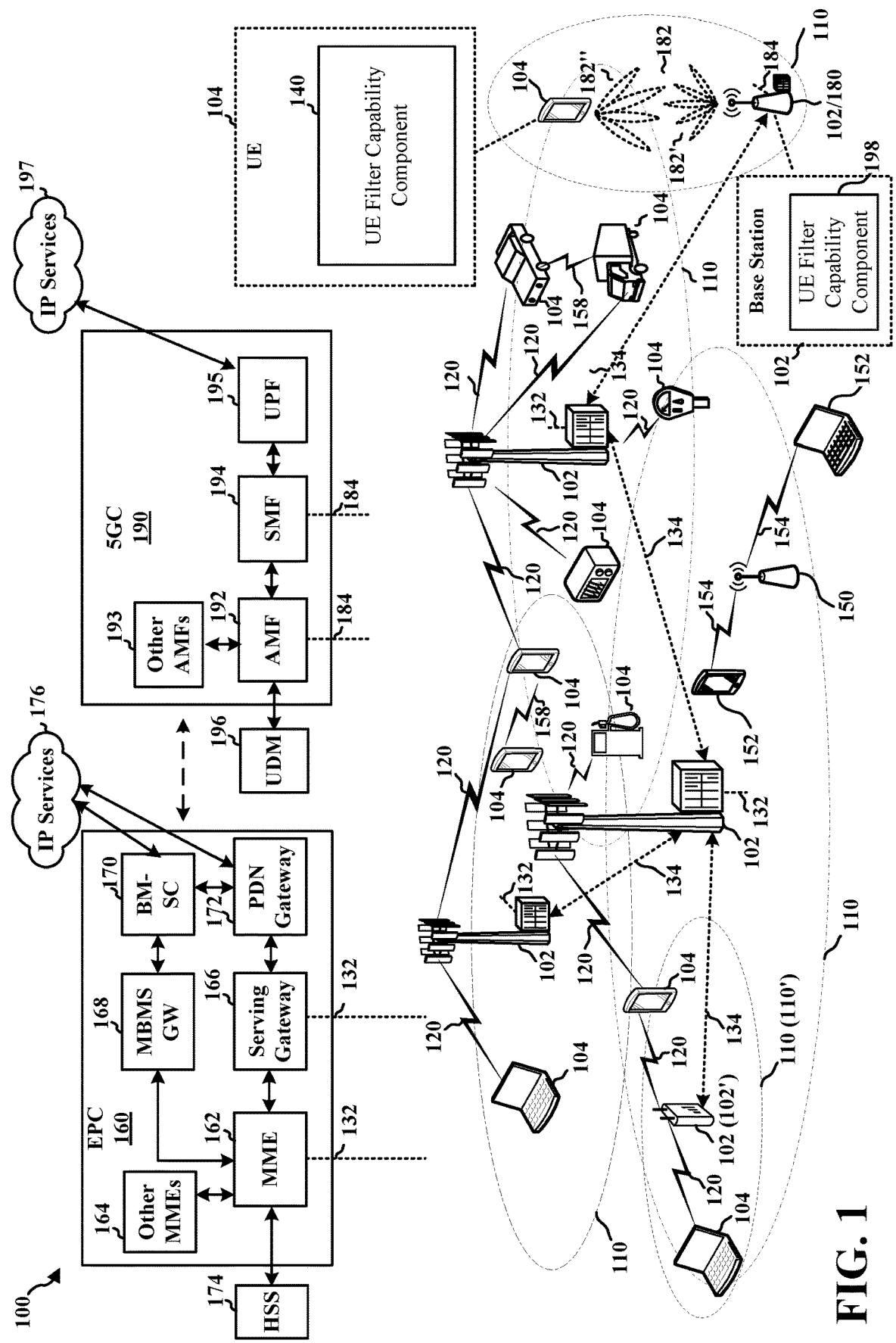
FIG. 1 is a diagram illustrating an example of a wireless communications system and an access network, including user equipment (UE) and base station components for implementing UE filter capability reporting, according to some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G NR, the concepts described herein may be applicable to other similar areas, such as LTE, LTE-A, CDMA, GSM, and other wireless technologies.

Aspects of the present disclosure provide user equipment (UE) filter capability reporting to support the operation of a UE in a full duplex (FD) system. In some aspects, for example, different UEs may have different processing capabilities and/or may require different amounts of time to adapt their filter capability over time, and therefore each UE may indicate UE filtering capabilities to selectively enable FD communication. Some further aspects determine, either based on a UE capability report or based on a rule (e.g., a specification rule according to the Third Generation Partnership Project (3GPP)), whether a UE can maintain phase and/or frequency coherence when switching to sub-band (SB) FD (SBFD) communication, where maintaining phase/frequency coherence refers to maintaining a constant phase/frequency difference between two channels. Further details of the present aspects are described below with reference to the appended drawings.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 including a UE 104 and a network entity 102, also referred to herein as a base station 102 (e.g., a gNB) and/or a disaggregated base station, configured to implement UE filter capability reporting for FD communication. In an aspect, for example, the UE 104 includes UE filter capability component 140 configured to report a capability to the network entity 102 for configuring the UE for FD communication. In some aspects, UE filter capability component 198 in the base station 102 may provide corresponding functionality to receive a capability report from the UE 104 and/or otherwise configure the UE for FD communication. Further details of the operation of UE filter capability component 140 of the UE 104 and UE filter capability component 198 of the base station 102 are described below with reference to FIGS. 2A-2D, 3A, 3B, 4A, 4B, 5, 6A-6C, and 7-12.

The wireless communications system (also referred to as a wireless wide area network (WWAN)) may also include other base stations 102, other UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 132, 134, 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158, e.g., including synchronization signals. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring to FIGS. 2A-2D, one or more example frame structures, channels, and resources may be used for communication between the base stations 102 and the UEs 104 of FIG. 1. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu 0$ to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Some present aspects provide a mechanism to support duplex communication for NR time division duplex (TDD) in unpaired spectrum, which is a frequency spectrum where unequal duty cycles may be allocated in the time domain for uplink (UL) and downlink (DL). In some aspects, SB non-overlapping FD communication and/or dynamic/flexible TDD may cause, and may therefore require mitigation of, self-interference and inter-gNB and inter-UE cross-link interference (CLI), such as intra-sub-band CLI and inter-sub-band CLI in case of SB non-overlapping FD communication, inter-sub-band CLI and inter-operator CLI at gNB, and inter-sub-band CLI and inter-operator CLI at UE.

Figure 3B:
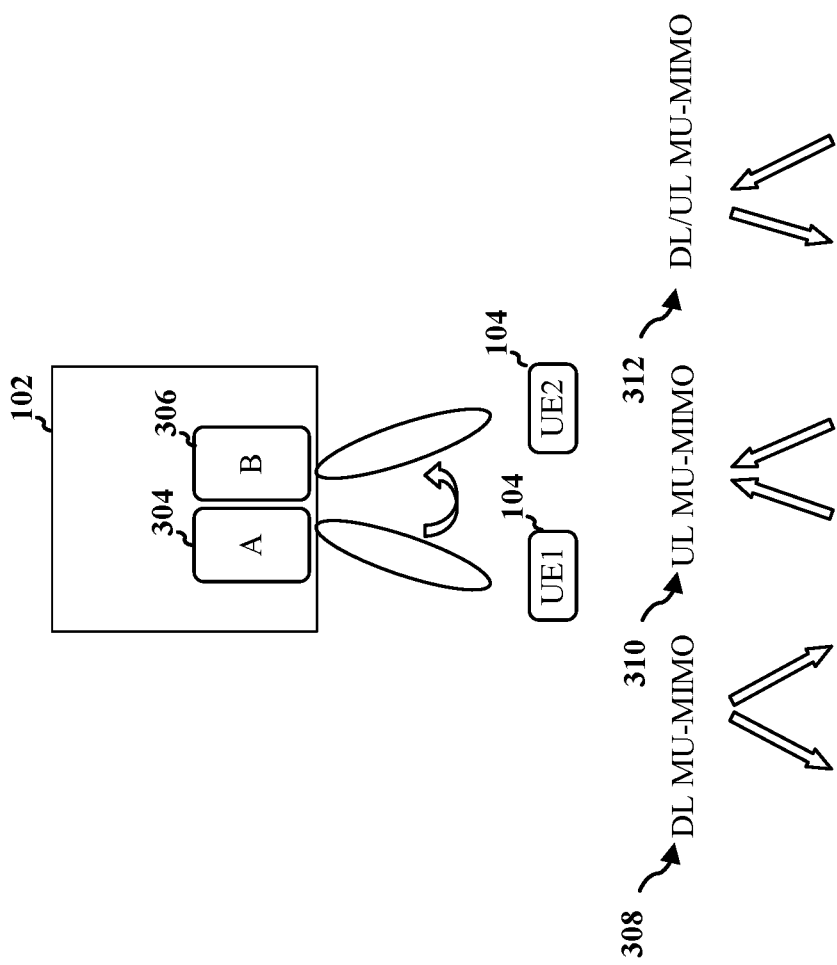
FIG. 3B is a diagram illustrating various modes of communication between a network entity and one or more UEs, according to some aspects of the present disclosure.
Figure 3A:
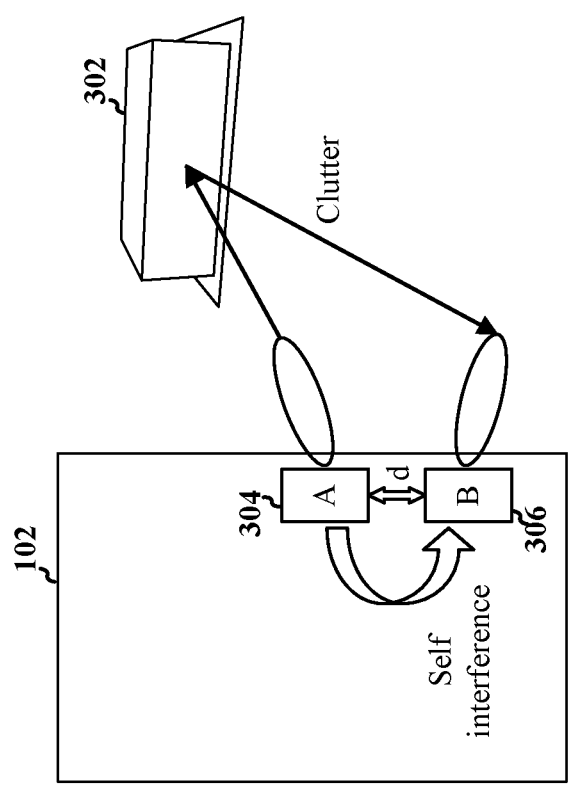
FIG. 3A is a diagram illustrating an example system implementing duplex communication, according to some aspects of the present disclosure.

For example, referring to FIGS. 3A and 3B, in some non-limiting aspects, FD communication may be supported at a network entity 102 while half duplex (HD) operation is supported at UEs 104, optionally with no restriction on frequency ranges. In an aspect, for example, the network entity 102 may communicate using a first panel 304 and a second panel 306 concurrently, where the second panel 306 is spaced apart from the first panel 304 by a distance "d." For example, the network entity 102 may implement DL multi-user (MU) multiple-input multiple-output (MU-MIMO) communication 308 by using the first panel 304 and the second panel 306 for signal transmission to two UEs 104 at the same time. Similarly, the network entity 102 may implement UL MU-MIMO communication 310 by using the first panel 304 and the second panel 306 for signal reception from two UEs 104 at the same time.

Further, the network entity 102 may implement DL/UL MU-MIMO communication 312 (FD communication) by using the first panel 304 for signal transmission to one UE 104 and at the same time using the second panel 306 for signal reception from another UE 104. In this case, transmissions of the first panel 304 may be directly received by the second panel 306, thus causing self-interference at the network entity 102. Also, transmissions of the first panel 304 may be indirectly received by the second panel 306 as clutter due to reflection by nearby objects 302 (e.g., buildings, etc.).

Referring to FIG. 4A, in one non-limiting example aspect, the network entity may support SBFD communication in a slot by configuring a component carrier (CC) bandwidth into two DL SBs 402 and one UL SB 404, where the UL SB 404 is configured between the two DL SBs 402 (also referred to as SB non-overlapping FD communication). However, the present aspects are not so limited. For example, in one non-limiting alternative aspect, the network entity may support SBFD communication in a slot by configuring a CC bandwidth into one DL SB 402 and one UL SB 404.

When implementing SBFD communication, the network entity 102 may simultaneously transmit DL communication to one UE 104 over one or more DL SBs 402 in a slot and receive UL communication from another UE 104 over the UL SB 404 in the same slot. Implementing SBFD communication may allow for increasing the UL duty cycle, which may lead to latency reduction, e.g., by receiving a DL signal in UL-only slots. These aspects may also improve UL coverage, enhance system capacity/resource utilization/spectrum efficiency, and enable flexible and dynamic UL/DL resource adaption according to UL/DL traffic. For example, referring to FIG. 4B, in some non-limiting example aspects, the network entity 102 may also configure some slots as only DL 406 or only UL 408. Accordingly, in some present aspect, the network entity 102 informs the UEs of the time and/or frequency location of the SBs that the network entity 102 configures for SBFD operation.

Figure 5:
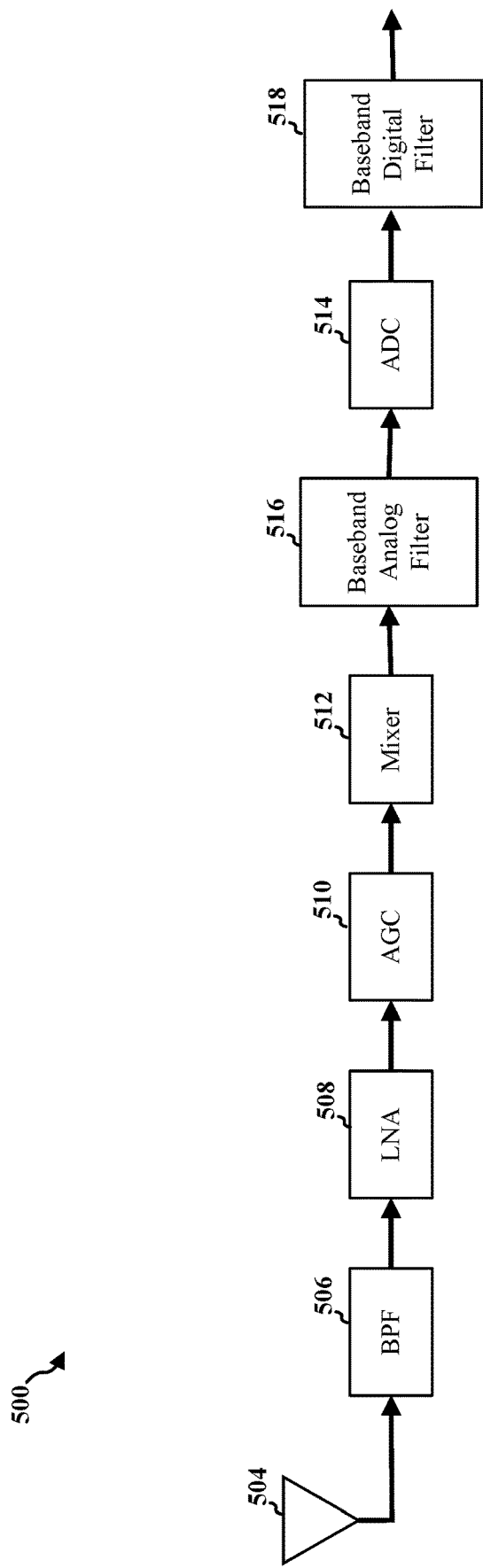
FIG. 5 is an example receive (Rx) chain of a UE, according to some aspects of the present disclosure.

Referring to FIG. 5, in some non-limiting example aspects, an Rx chain 500 of a UE 104 may implement a filtering mechanism to support SBFD communication. The Rx chain 500 may include an antenna 504, a band-pass filter 506, a low-noise amplifier (LNA) 508, an automatic gain controller (AGC) 510, a mixer 512, a baseband analog filter 516, an analog-to-digital converter (ADC) 514, and a baseband digital filter 518. In some aspects, the Rx chain 500 may adaptively configure one or more pass bands of the baseband analog filter 516 and/or the baseband digital filter 518 in order to support SBFD communication. For example, the baseband analog filter 516 and/or the baseband digital filter 518 may be configured with one or more pass bands (e.g., one or more 20 MHz pass bands) for passing one or more of the DL SBs 402 (FIG. 4A) and one or more stop bands for stopping the UL SB 404 (FIG. 4A). This would allow for receiving DL signals over the DL SBs 402 while avoiding interference from another UE that is transmitting over the UL SB 404 at the same time.

For example, in some non-limiting aspects, if a UE 104 includes two Rx chains 500, the network entity 102 may configure two DL SBs for that UE 104 (e.g., as illustrated in FIG. 4A). In this case, each of the two baseband analog filters 516 in the two Rx chains 500 of the UE 104 may be configured as a baseband low-pass filter for reception of one of the two DL SBs, with proper local oscillator shift (e.g., as illustrated in pass band configuration 600 in FIG. 6A for reception of a DL signal such as a PDSCH in two parts). That is, one baseband analog filters 516 is used for one of the DL SBs and the other baseband analog filters 516 is used for the other one of the DL SBs.

Figure 6:
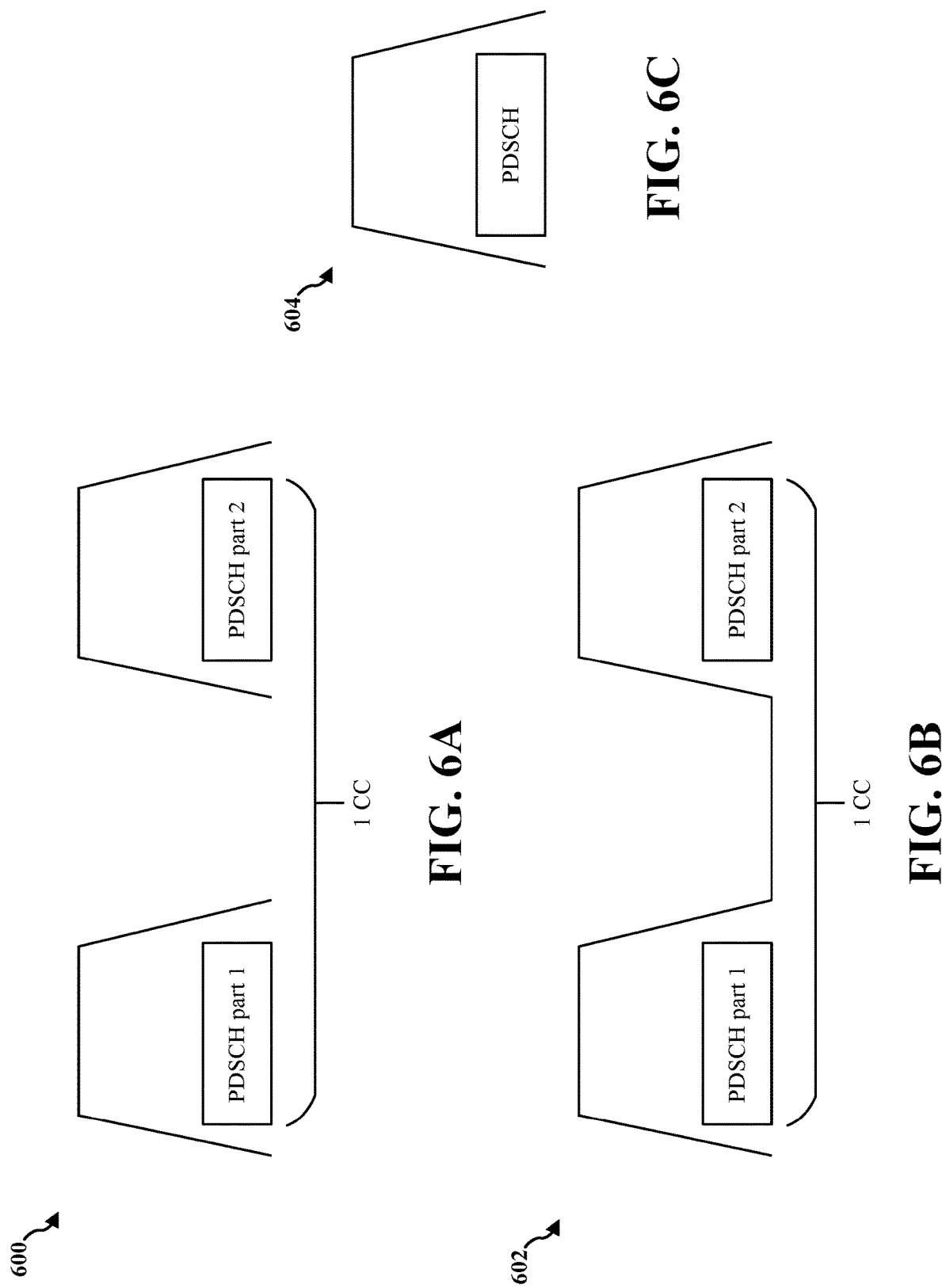
FIG. 6A is an example pass band configuration of two filters in two Rx chains of a UE for reception of two downlink (DL) sub-bands (SBs), according to some aspects of the present disclosure.
FIG. 6B is an example pass band configuration of a filter in an Rx chain of a UE for reception of two DL SBs, according to some aspects of the present disclosure.
FIG. 6C is another example pass band configuration of a filter in an Rx chain of a UE for reception of one DL SB, according to some aspects of the present disclosure.

Alternatively, if a UE 104 includes only one Rx chain 500, and if the network entity 102 configures two DL SBs for that UE 104, the single baseband analog filter 516 may be configured with two pass bands for reception of both DL SBs (e.g., as illustrated in pass band configuration 602 in FIG. 6B for reception of a DL signal such as a PDSCH in two parts).

Alternatively, if a UE 104 includes only one Rx chain 500, and if the network entity 102 configures one DL SB for that UE 104, the baseband analog filter 516 may be configured with one pass band for reception of that DL SB (e.g., as illustrated in pass band configuration 604 in FIG. 6C for reception of a DL signal such as a PDSCH). For example, the baseband analog filter 516 may be switched to a reduced bandwidth baseband analog filter for SBFD.

In some alternative or additional example aspects, the UE 104 may adaptively configure the baseband digital filter 518 for supporting SBFD communication. Again, if a UE 104 includes two Rx chains 500, the network entity 102 may configure two DL SBs for that UE 104 (e.g., as illustrated in FIG. 4A). In this case, each of the two baseband digital filters 518 in the two Rx chains 500 of the UE 104 may be configured for reception of one of the two DL SBs. Alternatively, if a UE 104 includes only one Rx chain 500, and if the network entity 102 configures two DL SBs for that UE 104, the baseband digital filter 518 may be configured with two pass bands for reception of both DL SBs. Alternatively, if a UE 104 includes only one Rx chain 500, and if the network entity 102 configures one DL SB for that UE 104, the baseband digital filter 518 may be configured with one pass band for reception of that DL SB (e.g., the baseband digital filter 518 may be switched to a reduced bandwidth baseband digital filter for SBFD).

In some aspects, using one or more baseband analog filters 516 at the Rx chain 500 of the UE 104 for supporting SBFD communication of the network entity 102 may improve the matching of ADC dynamic range with a desired signal.

In some aspects, using one or more baseband analog filters 516 at the Rx chain 500 of the UE 104 for supporting SBFD communication of the network entity 102 may improve CLI suppression for better decoding performance.

In some aspects, using one or more baseband analog filters 516 at the Rx chain 500 of the UE 104 for supporting SBFD communication of the network entity 102 may improve power savings, e.g., by lowering a sampling rate.

In some aspects, using one or more baseband digital filters 518 at the Rx chain 500 of the UE 104 for supporting SBFD communication of the network entity 102 may improve power savings, e.g., by lowering the bit width per tap.

In some aspects, in SBFD communication, the network entity may indicate that CSI-RS is measured only on DL SBs, and that UL SBs are unavailable resources for CSI-RS measurement for improving measurement accuracy.

In some aspects, some UEs may not include an adaptively configurable filter such as an adaptively configurable baseband analog filter 516 or an adaptively configurable baseband digital filter 518. Therefore, a UE may or may not have the capability to adaptively change a UE filter between SBFD and HD symbols/slots. Accordingly, in some present aspects, a UE 104 may send a UE filter capability report to the network entity 102 to indicate whether the UE 104 has the capability for Rx chain filter tuning, e.g., the capability to adaptively change a UE Rx chain filter between SBFD and HD symbols/slots. In some further optional aspects, either in the same capability report or in a separate capability report, the UE may also report corresponding filter adaptation latency if the UE supports filter tuning.

In some aspects, for example, the UE may report UE Rx chain filter adaptation capability for using two baseband low pass filters for SBFD, where each low pass filter corresponds to one Rx chain that receives one DL SB with proper local oscillator shift (e.g., FIG. 6A).

Alternatively or additionally, the UE may report UE Rx chain filter adaptation capability for using one baseband filter in one RX chain, where the baseband filter has two pass bands for receiving two DL SBs (e.g., FIG. 6B).

Alternatively or additionally, the UE may report UE Rx chain filter adaptation capability for using one baseband filter in one RX chain, where the baseband filter has one pass band for receiving one DL SB (e.g., FIG. 6C).

Alternatively or additionally, the UE may report UE Rx chain filter adaptation capability for using two digital filters for SBFD, where each digital filter corresponds to one Rx chain that receives one DL SB (e.g., FIG. 6A).

Alternatively or additionally, the UE may report UE Rx chain filter adaptation capability for using one digital filter in one Rx chain, where the digital filter has two pass bands for receiving two DL SBs (e.g., FIG. 6B).

Alternatively or additionally, the UE may report UE Rx chain filter adaptation capability for using one digital filter in one Rx chain, where the digital filter has one pass band for receiving one DL SB (e.g., FIG. 6C).

In some aspects, the UE may report none, one, or more than one of above UE filter capabilities.

In some alternative or additional aspects, the UE may report separate capability for Tx and Rx chain filter adaptation capability for SBFD. For example, in some aspects, the UE may report a capability for changing a Tx chain filter from wideband to narrowband for SBFD communication.

In some cases, when a UE implements Rx chain filter adaptation for SBFD, frequency coherence across SBs may be lost, where frequency coherence refers to having a constant frequency difference between two SBs.

In some present aspects, a UE may report whether the UE has the capability of receiving a single frequency division multiplexed (FDMed) DL signal (e.g., PDSCH, PDCCH, CSI-RS, etc.) via one or more supported options/capabilities. The UE may also report whether dynamic switching is supported between a pair of the supported options/capabilities (e.g., the UE may report that option 2 and option 4 below are dynamically switchable, and/or may report that option 1 and option 4 below are not dynamically switchable, etc.)

In an aspect, for example, the UE may report a first option to support joint decoding/reception of a DL signal on two DL SBs (e.g., a PDSCH signal transmitted in two parts in two DL SBs as in FIG. 6A).

In an alternative or additional aspect, for example, the UE may report a second option to support reception of a DL signal on only one SB at a given time, and that the SB is switchable between two DL SBs (e.g., with DL/UL/DL SB configuration, receiving a full PDSCH over a first SB in a first slot, and receiving another full PDSCH over a second SB in a second slot).

In an alternative or additional aspect, for example, the UE may report a third option to support reception of a DL signal on only one fixed SB out of two DL SBs, and that the fixed SB is not switchable between the two DL SBs.

In an alternative or additional aspect, for example, the UE may report a fourth option to support simultaneous and separate reception of a DL signal on two SBs when the UE has two decoder chains (e.g., receiving a full PDSCH over a first SB and also over a second SB in a same slot).

In an aspect, for example, a UE that implements two low pass filters in two respective Rx chains to support SBFD may not be able to independently decode on the two filters. If the UE reports that the UE does not have the capability of receiving a single FDMed DL signal on both DL SBs, the network entity schedules the DL signal (e.g., PDSCH) for the UE on only one DL SB. Otherwise, the network entity may schedule the FDMed DL signal for the UE on both DL SBs.

In an aspect, for example, a UE that implements one filter in one Rx chain to support SBFD is able to decode on that filter. If the UE reports that the UE has the capability of receiving a single FDMed DL signal on both SBs, the network entity may schedule the FDMed DL signal for the UE on both DL SBs.

In some present aspects, in adaptively changing a UE filter between SBFD and HD symbols/slots, a UE may report whether the UE has the capability of maintaining phase coherence for repetition combining/joint channel estimation across SBFD and TDD/HD symbols/slots, e.g., with filter adaptation. Phase coherence refers to having a constant phase difference between two channels. For example, if the network entity configures a number of slots for SBFD communication and a subsequent number of slots for HD communication, the UE may not be able to maintain phase coherence between those slots. In an aspect, for example, the UE may report that the UE cannot maintain phase coherence with filter adaptation for repetition combining/joint channel estimation across SBFD and TDD/HD symbols/slots. This is because when doing channel estimation, there are phase changes across multiple symbols, and therefore the UE cannot combine them or perform joint channel estimation.

Alternatively, instead of capability signaling, a rule (e.g., a 3GPP specification rule) may be defined with filter adaptation, indicating that at least when the UE supports filter adaptation, phase coherence for repetition combining/joint channel estimation across SBFD and TDD/HD symbols/slots cannot be maintained. Accordingly, the UE is not expected to conduct joint channel estimation/demodulation reference signal (DMRS) bounding across SBFD and TDD/HD symbols/slots (e.g., at least when the UE supports filter adaptation).

In some present aspects, a UE may report whether the UE has the capability of maintaining frequency coherence for non-contiguous DL SBs (e.g., maintaining a constant frequency difference between two DL SBs), at least when UE supports filter adaptation. If a UE does not support this capability, the remaining RBs in the SB are counted as one precoding resource block (PRG) for precoding, even if the number of remaining RBs is less than an RRC-configured number of RBs per PRG. Alternatively, if a UE does not support this capability, the network entity ensures that each SB includes an integer number of RBs of PRGs.

Alternatively, instead of capability signaling, a rule (e.g., a 3GPP specification rule) may be defined, indicating that a PRG cannot cross two DL SBs, at least when the UE supports filter adaptation.

Figure 7:
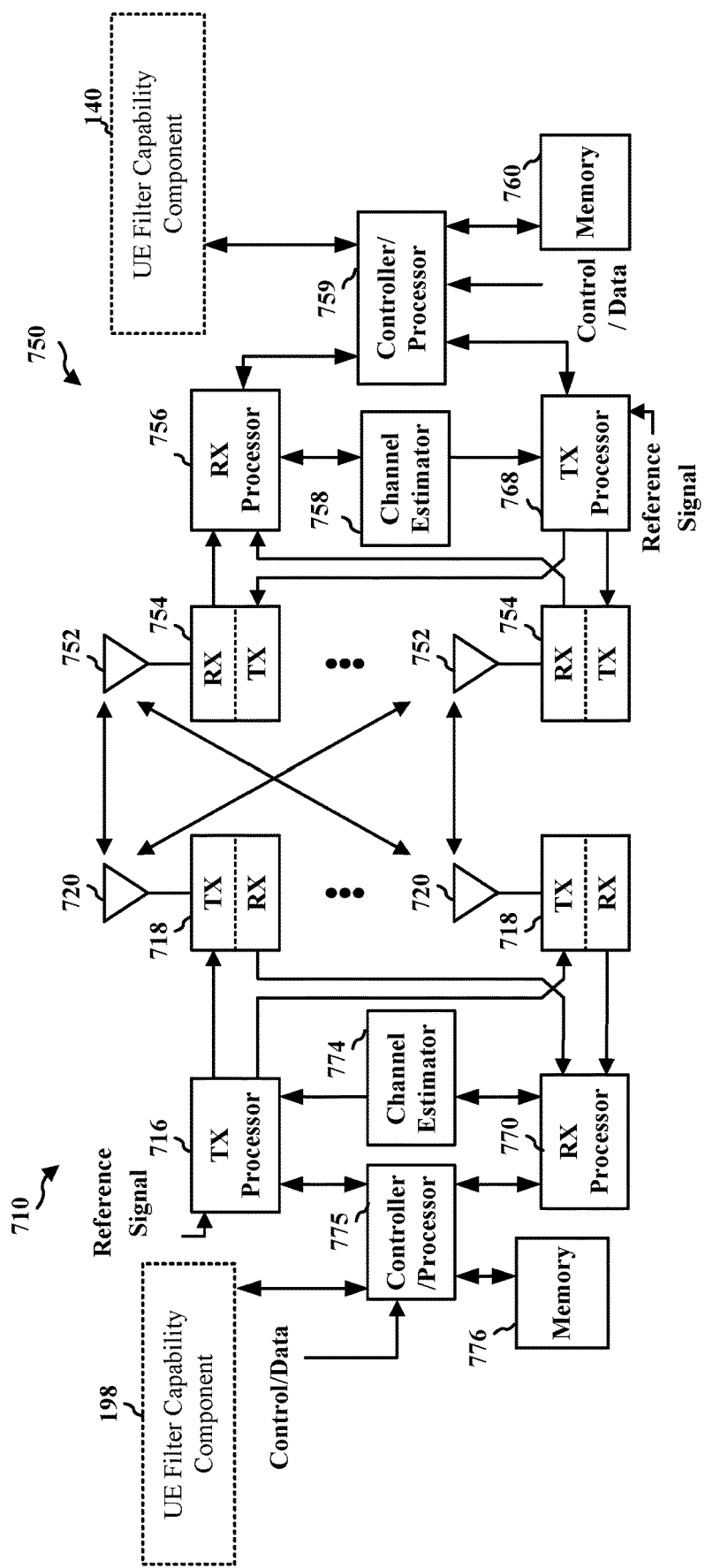
FIG. 7 is a diagram illustrating an example of a base station and a UE in an access network, according to some aspects of the present disclosure.

FIG. 7 is a block diagram of a base station 710 including UE filter capability component 198 in communication with a UE 750 including UE filter capability component 140 in an access network, where the base station 710 may be an example implementation of base station 102 and where UE 750 may be an example implementation of UE 104. In the DL, IP packets from the EPC 160 may be provided to a controller/processor 775. The controller/processor 775 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 775 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 716 and the receive (RX) processor 770 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 716 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the UE 750. Each spatial stream may then be provided to a different antenna 720 via a separate transmitter 718TX. Each transmitter 718TX may modulate an RF carrier with a respective spatial stream for transmission.

At the UE 750, each receiver 754RX receives a signal through its respective antenna 752. Each receiver 754RX recovers information modulated onto an RF carrier and provides the information to the receive (RX) processor 756. The TX processor 768 and the RX processor 756 implement layer 1 functionality associated with various signal processing functions. The RX processor 756 may perform spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 710. These soft decisions may be based on channel estimates computed by the channel estimator 758. The soft decisions are then decoded and deinterleaved to recover the data and control signals that were originally transmitted by the base station 710 on the physical channel. The data and control signals are then provided to the controller/processor 759, which implements layer 3 and layer 2 functionality.

The controller/processor 759 can be associated with a memory 760 that stores program codes and data. The memory 760 may be referred to as a computer-readable medium. In the UL, the controller/processor 759 provides demultiplexing between transport and logical channels, packet reassembly, deciphering, header decompression, and control signal processing to recover IP packets from the EPC 160. The controller/processor 759 is also responsible for error detection using an ACK and/or NACK protocol to support HARQ operations.

Similar to the functionality described in connection with the DL transmission by the base station 710, the controller/processor 759 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 758 from a reference signal or feedback transmitted by the base station 710 may be used by the TX processor 768 to select the appropriate coding and modulation schemes, and to facilitate spatial processing. The spatial streams generated by the TX processor 768 may be provided to different antenna 752 via separate transmitters 754TX. Each transmitter 754TX may modulate an RF carrier with a respective spatial stream for transmission.

The UL transmission is processed at the base station 710 in a manner similar to that described in connection with the receiver function at the UE 750. Each receiver 718RX receives a signal through its respective antenna 720. Each receiver 718RX recovers information modulated onto an RF carrier and provides the information to a RX processor 770.

The controller/processor 775 can be associated with a memory 776 that stores program codes and data. The memory 776 may be referred to as a computer-readable medium. In the UL, the controller/processor 775 provides demultiplexing between transport and logical channels, packet reassembly, deciphering, header decompression, control signal processing to recover IP packets from the UE 750. IP packets from the controller/processor 775 may be provided to the EPC 160. The controller/processor 775 is also responsible for error detection using an ACK and/or NACK protocol to support HARQ operations.

At least one of the TX processor 768, the RX processor 756, and the controller/processor 759 may be configured to perform aspects described herein in connection with UE filter capability component 140 in the UE 104 of FIG. 1.

At least one of the TX processor 716, the RX processor 770, and the controller/processor 775 may be configured to perform aspects described herein in connection with UE filter capability component 198 in the network entity 102 of FIG. 1.

Figure 8:
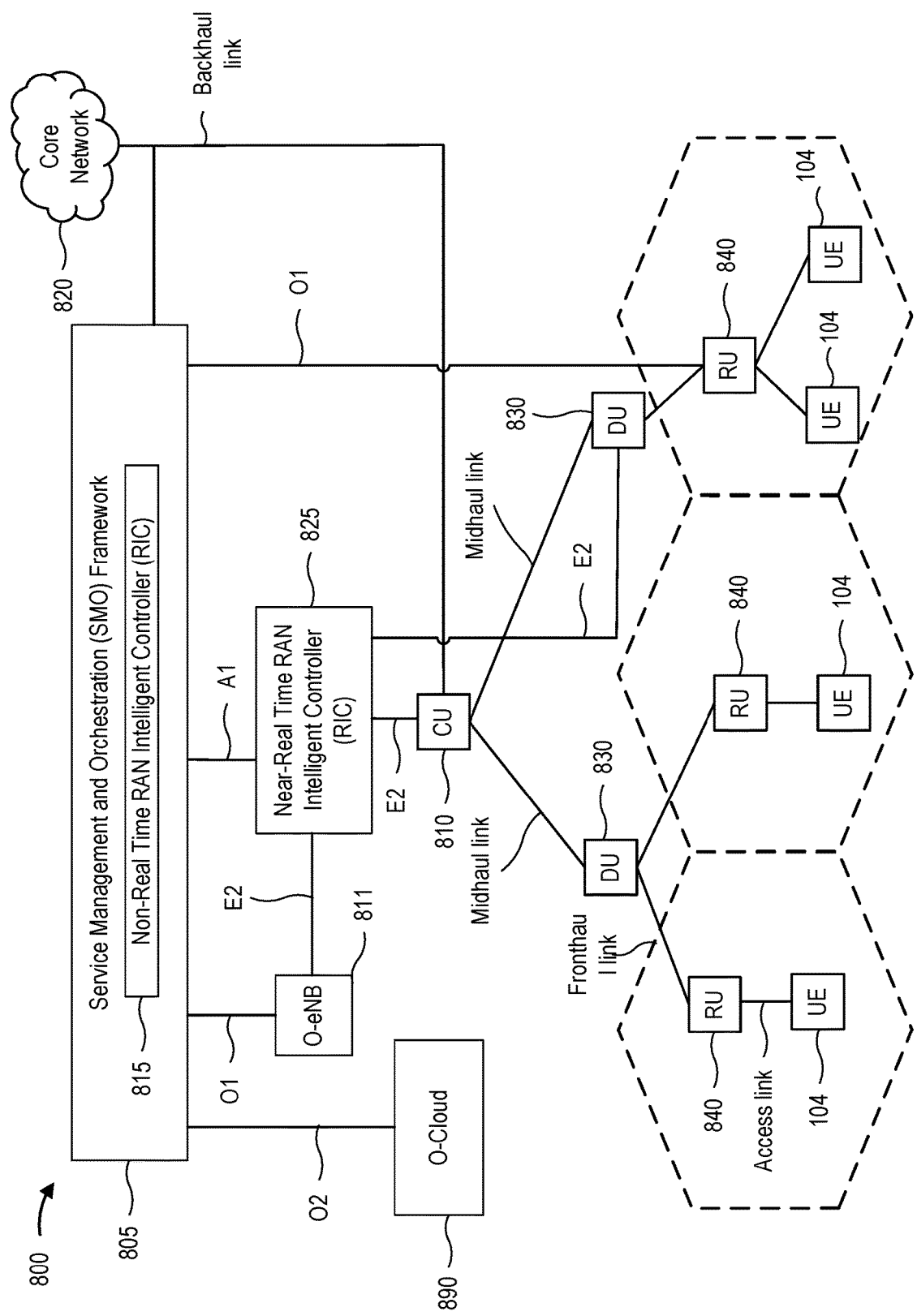
FIG. 8 is a diagram illustrating an example of disaggregated base station architecture, according to some aspects of the present disclosure.

Referring to FIG. 8, an example of disaggregated base station 800 architecture includes one or more components that may act as a network device as described herein. The disaggregated base station 800 architecture may include one or more central units (CUs) 810 that can communicate directly with a core network 820 via a backhaul link, or indirectly with the core network 820 through one or more disaggregated base station units (such as a Near-Real Time (Near-RT) RAN Intelligent Controller (RIC) 825 via an E2 link, or a Non-Real Time (Non-RT) RIC 815 associated with a Service Management and Orchestration (SMO) Framework 805, or both). A CU 810 may communicate with one or more distributed units (DUs) 830 via respective midhaul links, such as an F1 interface. The DUs 830 may communicate with one or more radio units (RUs) 840 via respective fronthaul links. The RUs 840 may communicate with respective UEs 104 via one or more radio frequency (RF) access links. In some implementations, the UE 104 may be simultaneously served by multiple RUs 840.

Each of the units, e.g., the CUs 810, the DUs 830, the RUs 840, as well as the Near-RT RICs 825, the Non-RT RICs 815 and the SMO Framework 805, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 810 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 810. The CU 810 may be configured to handle user plane functionality (i.e., Central Unit-User Plane (CU-UP)), control plane functionality (i.e., Central Unit-Control Plane (CU-CP)), or a combination thereof. In some implementations, the CU 810 can be logically split into one or more CU-UP units and one or more CU-CP units. The CU-UP unit can communicate bidirectionally with the CU-CP unit via an interface, such as the E1 interface when implemented in an O-RAN configuration. The CU 810 can be implemented to communicate with the DU 830, as necessary, for network control and signaling.

The DU 830 may correspond to a logical unit that includes one or more base station functions to control the operation of one or more RUs 840. In some aspects, the DU 830 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 830 may further host one or more low PHY layers. Each layer (or module) can be implemented with an interface configured to communicate signals with other layers (and modules) hosted by the DU 830, or with the control functions hosted by the CU 810.

Lower-layer functionality can be implemented by one or more RUs 840. In some deployments, an RU 840, controlled by a DU 830, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 840 can be implemented to handle over the air (OTA) communication with one or more UEs 104. In some implementations, real-time and non-real-time aspects of control and user plane communication with the RU(s) 840 can be controlled by the corresponding DU 830. In some scenarios, this configuration can enable the DU(s) 830 and the CU 810 to be implemented in a cloud-based RAN architecture, such as a vRAN architecture.

The SMO Framework 805 may be configured to support RAN deployment and provisioning of non-virtualized and virtualized network elements. For non-virtualized network elements, the SMO Framework 805 may be configured to support the deployment of dedicated physical resources for RAN coverage requirements which may be managed via an operations and maintenance interface (such as an O1 interface). For virtualized network elements, the SMO Framework 805 may be configured to interact with a cloud computing platform (such as an open cloud (O-Cloud) 890) to perform network element life cycle management (such as to instantiate virtualized network elements) via a cloud computing platform interface (such as an O2 interface). Such virtualized network elements can include, but are not limited to, CUs 810, DUs 830, RUs 840 and Near-RT RICs 825. In some implementations, the SMO Framework 805 can communicate with a hardware aspect of a 4G RAN, such as an open eNB (O-eNB) 811, via an O1 interface. Additionally, in some implementations, the SMO Framework 805 can communicate directly with one or more RUs 840 via an O1 interface. The SMO Framework 805 also may include a Non-RT RIC 815 configured to support functionality of the SMO Framework 805.

The Non-RT RIC 815 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 825. The Non-RT RIC 815 may be coupled to or communicate with (such as via an A1 interface) the Near-RT RIC 825. The Near-RT RIC 825 may be configured to include a logical function that enables near-real-time control and optimization of RAN elements and resources via data collection and actions over an interface (such as via an E2 interface) connecting one or more CUs 810, one or more DUs 830, or both, as well as an O-eNB, with the Near-RT RIC 825.

In some implementations, to generate AI/ML models to be deployed in the Near-RT RIC 825, the Non-RT RIC 815 may receive parameters or external enrichment information from external servers. Such information may be utilized by the Near-RT RIC 825 and may be received at the SMO Framework 805 or the Non-RT RIC 815 from non-network data sources or from network functions. In some examples, the Non-RT RIC 815 or the Near-RT RIC 825 may be configured to tune RAN behavior or performance. For example, the Non-RT MC 815 may monitor long-term trends and patterns for performance and employ AI/ML models to perform corrective actions through the SMO Framework 805 (such as reconfiguration via O1) or via creation of RAN management policies (such as A1 policies).

Figure 9:
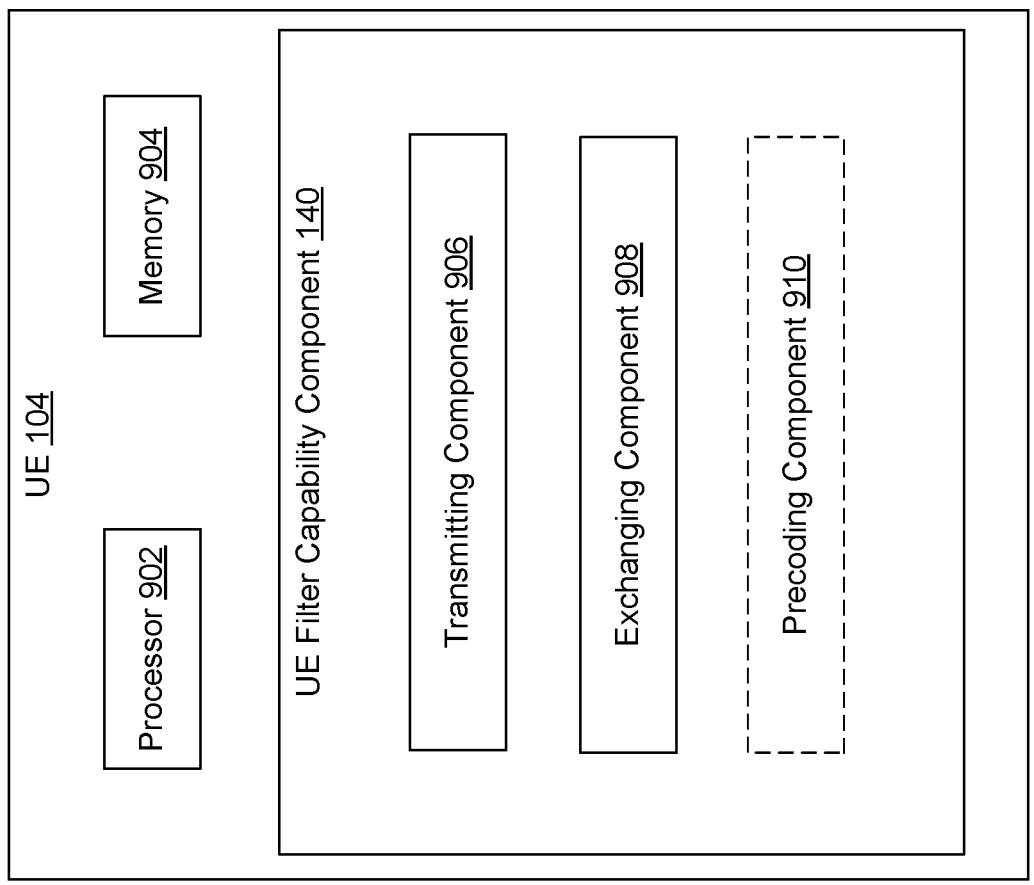
FIG. 9 is a block diagram of an example UE configured for implementing UE filter capability reporting, according to some aspects of the present disclosure.
Figure 10:
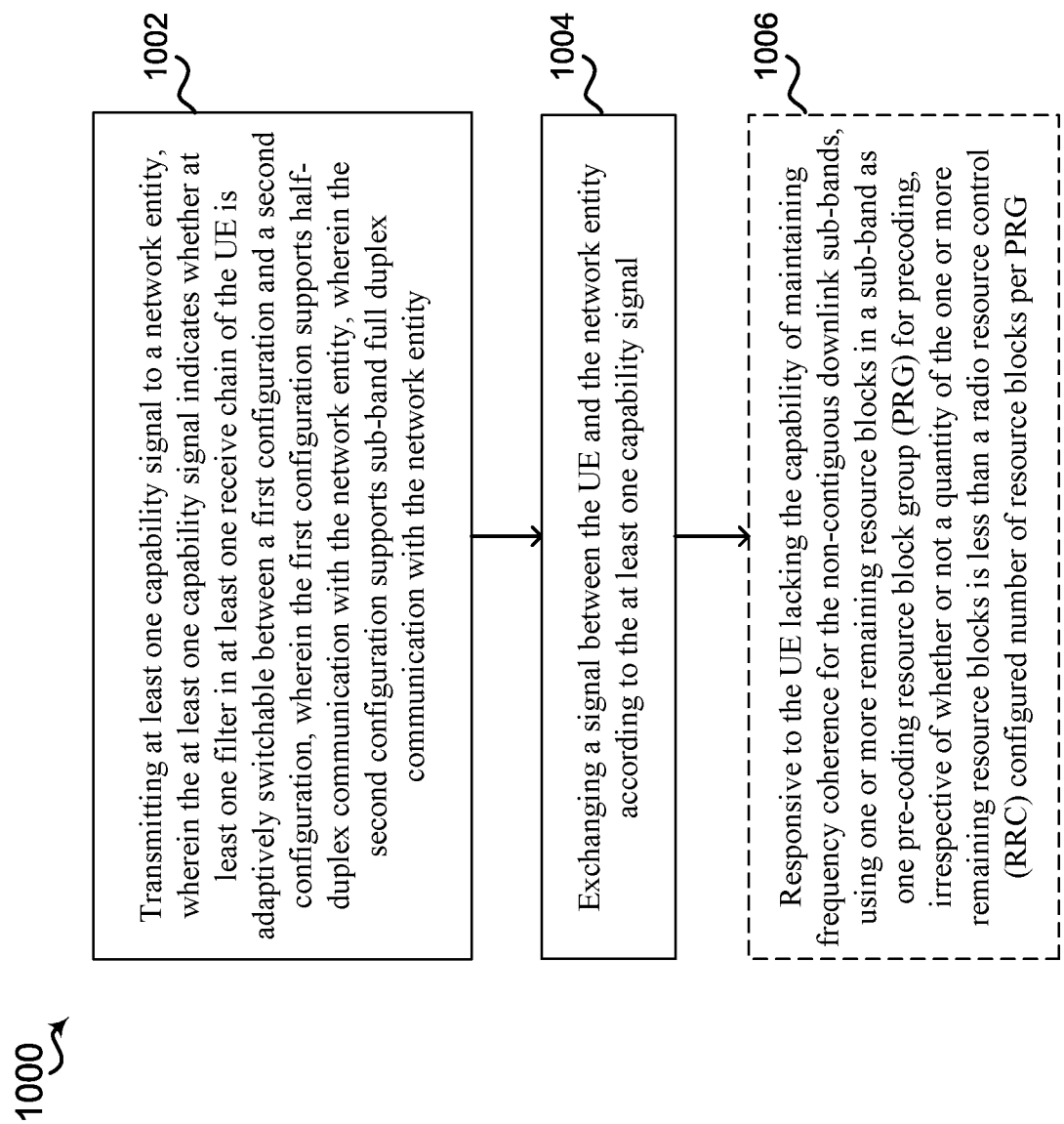
FIG. 10 is a flowchart of an example method of wireless communication by a UE for implementing UE filter capability reporting, according to some aspects of the present disclosure.

Referring to FIGS. 9 and 10, in operation, the UE 104 may perform a method 1000 of wireless communication, by such as via execution of UE filter capability component 140 by processor 902 and/or memory 904. In this and other implementations described herein, the processor 902 may include at least one of the TX processor 768, the RX processor 756, and the controller/processor 759 described above.

At block 1002, the method 1000 includes transmitting at least one capability signal to a network entity, wherein the at least one capability signal indicates whether at least one filter in at least one receive chain of the UE is adaptively switchable between a first configuration and a second configuration, wherein the first configuration supports half-duplex communication with the network entity, wherein the second configuration supports sub-band full duplex communication with the network entity. For example, in an aspect, UE 104, processor 902, memory 904, UE filter capability component 140, and/or transmitting component 906 may be configured to or may comprise means for transmitting at least one capability signal to a network entity, wherein the at least one capability signal indicates whether at least one filter in at least one receive chain of the UE is adaptively switchable between a first configuration and a second configuration, wherein the first configuration supports half-duplex communication with the network entity, wherein the second configuration supports sub-band full duplex communication with the network entity.

For example, referring to FIGS. 3B and 5, in one non-limiting example aspect, the transmitting at block 1002 may include a UE 104 transmitting a capability signal to a network entity 102 to indicate whether at least one filter (e.g., at least one baseband analog filter 516 and/or at least one baseband digital filter 518) in at least one Rx chain 500 of the UE 104 is adaptively switchable between a first configuration and a second configuration, wherein the first configuration supports HD communication with the network entity 102, wherein the second configuration supports SBFD communication with the network entity 102.

At block 1004, the method 1000 includes exchanging a signal between the UE and the network entity according to the at least one capability signal. For example, in an aspect, UE 104, processor 902, memory 904, UE filter capability component 140, and/or exchanging component 908 may be configured to or may comprise means for exchanging a signal between the UE and the network entity according to the at least one capability signal.

For example, referring to FIG. 3B, in one non-limiting example aspect, the exchanging at block 1002 may include the UE 104 and the network entity 102 exchanging a signal according to the UE filter capability signal.

In some optional implementations, the at least one capability signal further indicates a latency of the at least one filter (e.g., at least one baseband analog filter 516 and/or at least one baseband digital filter 518) in switching between the first configuration and the second configuration.

In some optional implementations, the at least one capability signal comprises a first capability signal and a second capability signal, wherein the first capability signal indicates whether the at least one filter (e.g., at least one baseband analog filter 516 and/or at least one baseband digital filter 518) is adaptively switchable, wherein the second capability signal indicates the latency.

In some optional implementations, the at least one capability signal comprises a single capability signal that indicates both the latency and whether the at least one filter (e.g., at least one baseband analog filter 516 and/or at least one baseband digital filter 518) is adaptively switchable.

In some optional implementations, a first receive chain of the UE is configurable for reception in a first downlink sub-band, wherein a second receive chain of the UE is configurable for reception in a second downlink sub-band different from the first downlink sub-band, wherein the at least one capability signal indicates that a first wideband analog baseband filter in the first receive chain of the UE is adaptively switchable with a first analog baseband filter corresponding to the first downlink sub-band, and a second wideband analog baseband filter in the second receive chain of the UE is adaptively switchable with a second analog baseband filter corresponding to the second downlink sub-band. For example, a UE 104 may include a first and a second receive chain 500 each having a baseband analog filter 516 that is switchable to support signal reception in a first and a second DL SB, respectively (e.g., FIG. 6A).

In some optional implementations, each one of the first analog baseband filter and the second analog baseband filter comprises an analog low pass filter.

In some optional implementations, a receive chain 500 of the UE 104 is configurable for reception in both a first downlink sub-band and a second downlink sub-band different from the first downlink sub-band, wherein the at least one capability signal indicates that an analog baseband filter 516 in the receive chain 500 of the UE 104 is adaptively switchable between the first configuration and the second configuration.

In some optional implementations, the analog baseband filter 516 comprises a first pass band and a second pass band spaced apart from the first pass band, wherein the first pass band corresponds to the first downlink sub-band, wherein the second pass band corresponds to the second downlink sub-band (e.g., FIG. 6B).

In some optional implementations, a receive chain 500 of the UE 104 is configurable for reception in a downlink sub-band, wherein the at least one capability signal indicates that a wideband analog baseband filter 516 in the receive chain 500 of the UE 104 is adaptively switchable with a reduced bandwidth analog baseband filter (e.g., FIG. 6C).

In some optional implementations, a first receive chain of the UE is configurable for reception in a first downlink sub-band, wherein a second receive chain of the UE is configurable for reception in a second downlink sub-band different from the first downlink sub-band, wherein the at least one capability signal indicates that a first wideband digital baseband filter in the first receive chain of the UE is adaptively switchable with a first digital baseband filter corresponding to the first downlink sub-band, and a second wideband digital baseband filter in the second receive chain of the UE is adaptively switchable with a second digital baseband filter corresponding to the second downlink sub-band. For example, a UE 104 may include a first and a second receive chain 500 each having a baseband digital filter 518 that is switchable to support signal reception in a first and a second DL SB, respectively (e.g., FIG. 6A).

In some optional implementations, a receive chain 500 of the UE 104 is configurable for reception in both a first downlink sub-band and a second downlink sub-band different from the first downlink sub-band, wherein the at least one capability signal indicates that a digital filter 518 in the receive chain 500 of the UE 104 is adaptively switchable between the first configuration and the second configuration (e.g., FIG. 6B).

In some optional implementations, a receive chain 500 of the UE 104 is configurable for reception in a downlink sub-band, wherein the at least one capability signal indicates that a wideband digital baseband filter 518 in the receive chain 500 the UE 104 is adaptively switchable with a reduced bandwidth digital baseband filter (e.g., FIG. 6C).

In some optional implementations, the at least one capability signal further indicates whether a bandwidth of at least one further filter in at least one transmit chain of the UE is adaptively configurable to support either the sub-band full duplex communication or the half-duplex communication with the network entity.

In some optional implementations, the at least one capability signal further indicates whether the UE 104 has a capability of providing one or more options for receiving a frequency division multiplexed (FDMed) signal on one or more downlink sub-bands.

In some optional implementations, the FDMed signal comprises a physical downlink shared channel (PDSCH), a physical downlink control channel (PDCCH), or a channel state information reference signal (CSI-RS).

In some optional implementations, the at least one capability signal further indicates whether a configuration of the UE 104 is dynamically switchable between at least two of the one or more options.

In some optional implementations, the one or more options include a first option for supporting joint decoding/reception of the FDMed signal on two downlink sub-bands.

In some optional implementations, the one or more options include a second option for supporting reception of the FDMed signal on a single downlink sub-band at a given time, wherein the single downlink sub-band is switchable between two downlink sub-bands at different times.

In some optional implementations, the one or more options include a third option for supporting reception of the FDMed signal on only one fixed downlink sub-band.

In some optional implementations, the UE 104 comprises two decoder chains, wherein the one or more options include a fourth option for supporting simultaneous and separate reception of the FDMed signal on two downlink sub-bands.

In some optional implementations, the at least one capability signal further indicates whether the UE 104 has a capability of maintaining phase coherence for repetition combining or joint channel estimation across sub-band full duplex and time division duplexing (TDD)/half duplex symbols or slots.

In some optional implementations, responsive to the at least one capability signal indicating that the at least one filter is adaptively switchable between the first configuration and the second configuration, based on a rule (e.g., a specification rule according to 3GPP) the UE 104 is not expected to maintain phase coherence for repetition combining or joint channel estimation across sub-band full duplex and time division duplexing (TDD)/half duplex symbols or slots.

In some optional implementations, responsive to the at least one capability signal indicating that the at least one filter is adaptively switchable between the first configuration and the second configuration, based on a rule (e.g., a specification rule according to 3GPP) the UE 104 avoids joint channel estimation or demodulation reference signal (DMRS) bounding across sub-band full duplex and time division duplexing (TDD)/half duplex symbols or slots.

In some optional implementations, responsive to the at least one filter being adaptively switchable between the first configuration and the second configuration, the at least one capability signal further indicates whether the UE 104 has a capability of maintaining frequency coherence for non-contiguous downlink sub-bands.

Optionally, at block 1006, the method 1000 may further include, responsive to the UE lacking the capability of maintaining frequency coherence for the non-contiguous downlink sub-bands, using one or more remaining resource blocks in a sub-band as one pre-coding resource block group (PRG) for precoding, irrespective of whether or not a quantity of the one or more remaining resource blocks is less than a radio resource control (RRC) configured number of resource blocks per PRG. For example, in an aspect, UE 104, processor 902, memory 904, UE filter capability component 140, and/or precoding component 910 may be configured to or may comprise means for, responsive to the UE lacking the capability of maintaining frequency coherence for the non-contiguous downlink sub-bands, using one or more remaining resource blocks in a sub-band as one pre-coding resource block group (PRG) for precoding, irrespective of whether or not a quantity of the one or more remaining resource blocks is less than a radio resource control (RRC) configured number of resource blocks per PRG.

For example, referring to FIG. 3B, in one non-limiting example aspect, if the UE 104 lacks the capability of maintaining frequency coherence for the non-contiguous DL SBs, one or more remaining RBs in an SB are counted as one PRG for precoding, even when the quantity of the remaining RBs is less than an RRC-configured number of RBs per PRG.

In some optional implementations, responsive to the UE 104 lacking the capability of maintaining frequency coherence for the non-contiguous downlink sub-bands, each sub-band is configured to include an integer number of resource blocks of pre-coding resource block groups (PRGs).

In some optional implementations, responsive to the at least one filter being adaptively switchable between the first configuration and the second configuration, based on a rule (e.g., a specification rule according to 3GPP) each pre-coding resource block group (PRG) is configured to avoid crossing two downlink sub-bands.

Figure 11:
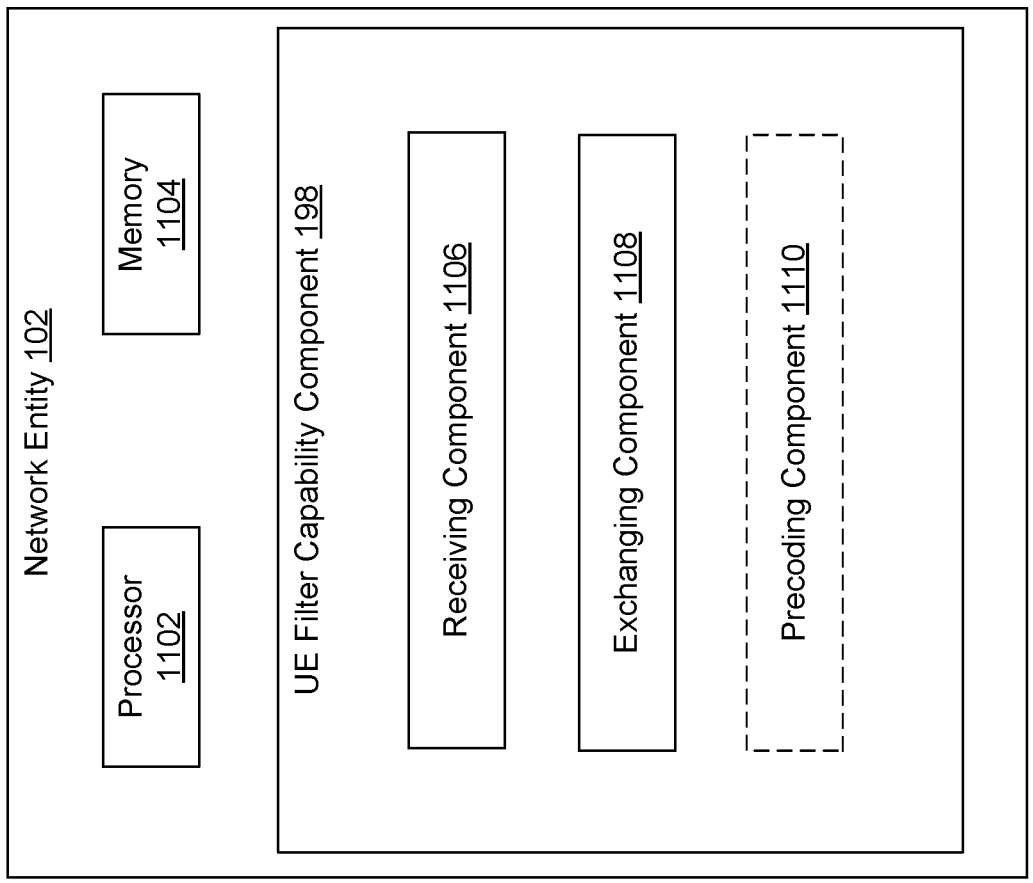
FIG. 11 is a block diagram of an example network entity configured for implementing UE filter capability reporting, according to some aspects of the present disclosure.
Figure 12:
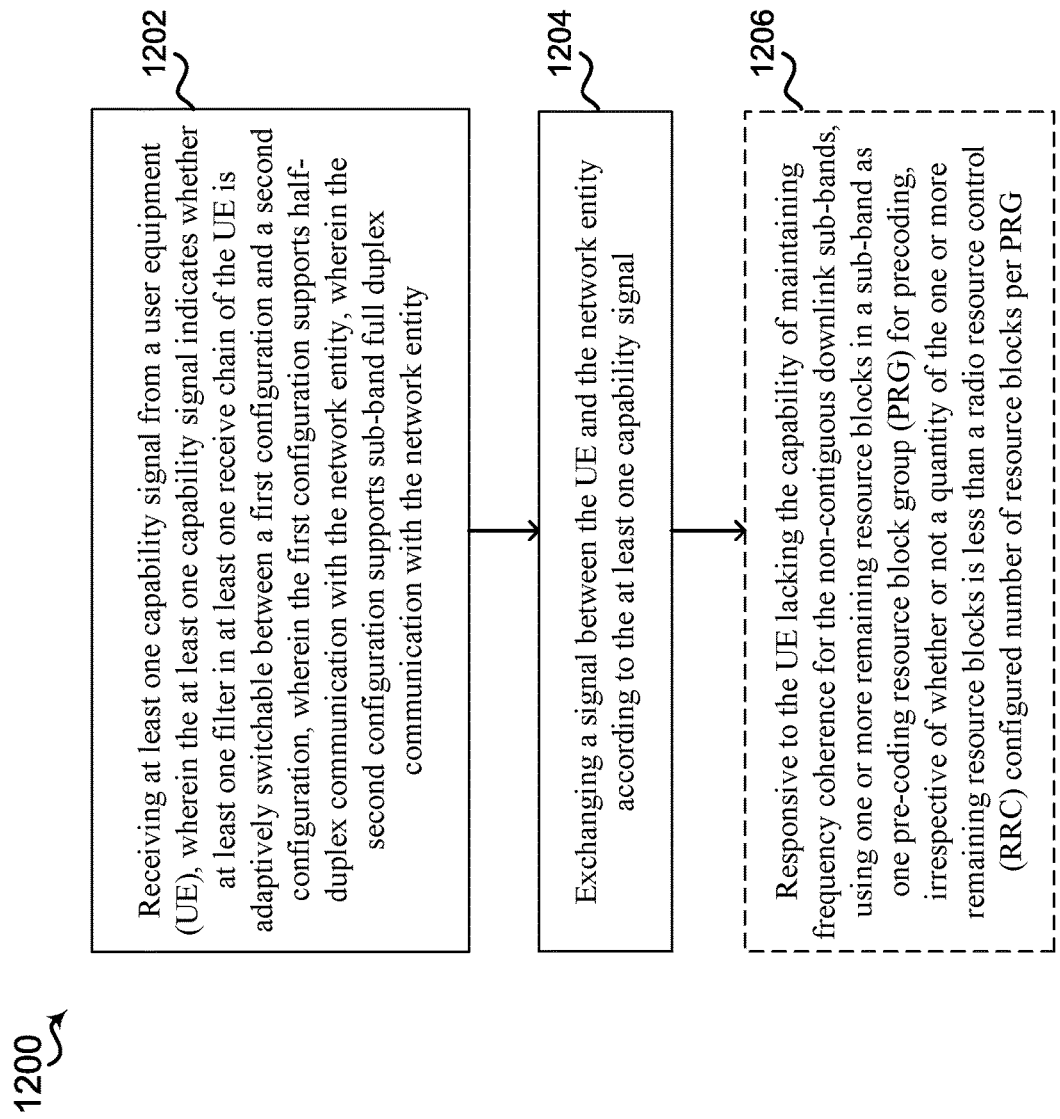
FIG. 12 is a flowchart of an example method of wireless communication by a network entity for implementing UE filter capability reporting, according to some aspects of the present disclosure.

Referring to FIGS. 11 and 12, in operation, the network entity 102 may perform a method 1200 of wireless communication, by such as via execution of UE filter capability component 198 by processor 1102 and/or memory 1104. In this and other implementations described herein, the processor 1102 may include at least one of the TX processor 716, the RX processor 770, and the controller/processor 775 described above.

At block 1202, the method 1200 includes receiving at least one capability signal from a user equipment (UE), wherein the at least one capability signal indicates whether at least one filter in at least one receive chain of the UE is adaptively switchable between a first configuration and a second configuration, wherein the first configuration supports half-duplex communication with the UE, wherein the second configuration supports sub-band full duplex communication with the UE. For example, in an aspect, network entity 102, processor 1102, memory 1104, UE filter capability component 198, and/or receiving component 1106 may be configured to or may comprise means for receiving at least one capability signal from a user equipment (UE), wherein the at least one capability signal indicates whether at least one filter in at least one receive chain of the UE is adaptively switchable between a first configuration and a second configuration, wherein the first configuration supports half-duplex communication with the UE, wherein the second configuration supports sub-band full duplex communication with the UE.

For example, referring to FIGS. 3B and 5, in one non-limiting example aspect, the receiving at block 1202 may include a network entity 102 receiving a capability signal from a UE 104 to indicate whether at least one filter (e.g., at least one baseband analog filter 516 and/or at least one baseband digital filter 518) in at least one receive chain 500 of the UE 104 is adaptively switchable between a first configuration and a second configuration, wherein the first configuration supports HD communication with the network entity 102, wherein the second configuration supports SBFD communication with the network entity 102.

At block 1204, the method 1200 includes exchanging a signal between the UE and the network entity according to the at least one capability signal. For example, in an aspect, network entity 102, processor 1102, memory 1104, UE filter capability component 198, and/or exchanging component 1108 may be configured to or may comprise means for exchanging a signal between the UE and the network entity according to the at least one capability signal.

For example, referring to FIG. 3B, in one non-limiting example aspect, the exchanging at block 1002 may include the UE 104 and the network entity 102 exchanging a signal according to the UE filter capability signal.

Optionally, at block 1206, the method 1200 may further include, responsive to the UE lacking the capability of maintaining frequency coherence for the non-contiguous downlink sub-bands, using one or more remaining resource blocks in a sub-band as one pre-coding resource block group (PRG) for precoding, irrespective of whether or not a quantity of the one or more remaining resource blocks is less than a radio resource control (RRC) configured number of resource blocks per PRG. For example, in an aspect, network entity 102, processor 1102, memory 1104, UE filter capability component 198, and/or precoding component 1110 may be configured to or may comprise means for, responsive to the UE lacking the capability of maintaining frequency coherence for the non-contiguous downlink sub-bands, using one or more remaining resource blocks in a sub-band as one pre-coding resource block group (PRG) for precoding, irrespective of whether or not a quantity of the one or more remaining resource blocks is less than a radio resource control (RRC) configured number of resource blocks per PRG.

For example, referring to FIG. 3B, in one non-limiting example aspect, if the UE 104 lacks the capability of maintaining frequency coherence for the non-contiguous DL SBs, one or more remaining RBs in an SB are counted as one PRG for precoding, even when the quantity of the remaining RBs is less than an RRC-configured number of RBs per PRG.

Some further aspects are provided below.

1. A method of wireless communication by a user equipment (UE), comprising:
   transmitting at least one capability signal to a network entity, wherein the at least one capability signal indicates whether at least one filter in at least one receive chain of the UE is adaptively switchable between a first configuration and a second configuration, wherein the first configuration supports half-duplex communication with the network entity, wherein the second configuration supports sub-band full duplex communication with the network entity; and
   exchanging a signal between the UE and the network entity according to the at least one capability signal.

2. The method of clause 1, wherein the at least one capability signal further indicates a latency of the at least one filter in switching between the first configuration and the second configuration.

3. The method of clause 2, wherein the at least one capability signal comprises a first capability signal and a second capability signal, wherein the first capability signal indicates whether the at least one filter is adaptively switchable, wherein the second capability signal indicates the latency.

4. The method of clause 2, wherein the at least one capability signal comprises a single capability signal that indicates both the latency and whether the at least one filter is adaptively switchable.

5. The method of any one of clauses 1 to 4, wherein a first receive chain of the UE is configurable for reception in a first downlink sub-band, wherein a second receive chain of the UE is configurable for reception in a second downlink sub-band different from the first downlink sub-band, wherein the at least one capability signal indicates that a first wideband analog baseband filter in the first receive chain of the UE is adaptively switchable with a first analog baseband filter corresponding to the first downlink sub-band, and a second wideband analog baseband filter in the second receive chain of the UE is adaptively switchable with a second analog baseband filter corresponding to the second downlink sub-band.

6. The method of clause 5, wherein each one of the first analog baseband filter and the second analog baseband filter comprises an analog low pass filter.

7. The method of any one of clauses 1 to 6, wherein a receive chain of the UE is configurable for reception in both a first downlink sub-band and a second downlink sub-band different from the first downlink sub-band, wherein the at least one capability signal indicates that an analog baseband filter in the receive chain of the UE is adaptively switchable between the first configuration and the second configuration.

8. The method of clause 7, wherein the analog baseband filter comprises a first pass band and a second pass band spaced apart from the first pass band, wherein the first pass band corresponds to the first downlink sub-band, wherein the second pass band corresponds to the second downlink sub-band.
9. The method of any one of clauses 1 to 8, wherein a receive chain of the UE is configurable for reception in a downlink sub-band, wherein the at least one capability signal indicates that a wideband analog baseband filter in the receive chain of the UE is adaptively switchable with a reduced bandwidth analog baseband filter.
10. The method of any one of clauses 1 to 9, wherein a first receive chain of the UE is configurable for reception in a first downlink sub-band, wherein a second receive chain of the UE is configurable for reception in a second downlink sub-band different from the first downlink sub-band, wherein the at least one capability signal indicates that a first wideband digital baseband filter in the first receive chain of the UE is adaptively switchable with a first digital baseband filter corresponding to the first downlink sub-band, and a second wideband digital baseband filter in the second receive chain of the UE is adaptively switchable with a second digital baseband filter corresponding to the second downlink sub-band.
11. The method of any one of clauses 1 to 10, wherein a receive chain of the UE is configurable for reception in both a first downlink sub-band and a second downlink sub-band different from the first downlink sub-band, wherein the at least one capability signal indicates that a digital filter in the receive chain of the UE is adaptively switchable between the first configuration and the second configuration.
12. The method of any one of clauses 1 to 11, wherein a receive chain of the UE is configurable for reception in a downlink sub-band, wherein the at least one capability signal indicates that a wideband digital baseband filter in the receive chain of the UE is adaptively switchable with a reduced bandwidth digital baseband filter.
13. The method of any one of clauses 1 to 12, wherein the at least one capability signal further indicates whether a bandwidth of at least one further filter in at least one transmit chain of the UE is adaptively configurable to support either the sub-band full duplex communication or the half-duplex communication with the network entity.
14. The method of any one of clauses 1 to 13, wherein the at least one capability signal further indicates whether the UE has a capability of providing one or more options for receiving a frequency division multiplexed (FDMed) signal on one or more downlink sub-bands.
15. The method of clause 14, wherein the FDMed signal comprises a physical downlink shared channel (PDSCH), a physical downlink control channel (PDCCH), or a channel state information reference signal (CSI-RS).
16. The method of clause 14 or 15, wherein the at least one capability signal further indicates whether a configuration of the UE is dynamically switchable between at least two of the one or more options.
17. The method of any one of clauses 14 to 16, wherein the one or more options include a first option for supporting joint decoding/reception of the FDMed signal on two downlink sub-bands.
18. The method of any one of clauses 14 to 17, wherein the one or more options include a second option for supporting reception of the FDMed signal on a single downlink sub-band at a given time, wherein the single downlink sub-band is switchable between two downlink sub-bands at different times.
19. The method of any one of clauses 14 to 18, wherein the one or more options include a third option for supporting reception of the FDMed signal on only one fixed downlink sub-band.
20. The method of any one of clauses 14 to 19, wherein the UE comprises two decoder chains, wherein the one or more options include a fourth option for supporting simultaneous and separate reception of the FDMed signal on two downlink sub-bands.
21. The method of any one of clauses 1 to 20, wherein the at least one capability signal further indicates whether the UE has a capability of maintaining phase coherence for repetition combining or joint channel estimation across sub-band full duplex and time division duplexing (TDD)/half duplex symbols or slots.
22. The method of any one of clauses 1 to 21, wherein, responsive to the at least one capability signal indicating that the at least one filter is adaptively switchable between the first configuration and the second configuration, based on a rule the UE is not expected to maintain phase coherence for repetition combining or joint channel estimation across sub-band full duplex and time division duplexing (TDD)/half duplex symbols or slots.
23. The method of any one of clauses 1 to 22, wherein, responsive to the at least one capability signal indicating that the at least one filter is adaptively switchable between the first configuration and the second configuration, based on a rule the UE avoids joint channel estimation or demodulation reference signal (DMRS) bounding across sub-band full duplex and time division duplexing (TDD)/half duplex symbols or slots.
24. The method of any one of clauses 1 to 23, wherein, responsive to the at least one filter being adaptively switchable between the first configuration and the second configuration, the at least one capability signal further indicates whether the UE has a capability of maintaining frequency coherence for non-contiguous downlink sub-bands.
25. The method of clause 24, further comprising, responsive to the UE lacking the capability of maintaining frequency coherence for the non-contiguous downlink sub-bands, using one or more remaining resource blocks in a sub-band as one pre-coding resource block group (PRG) for precoding, irrespective of whether or not a quantity of the one or more remaining resource blocks is less than a radio resource control (RRC) configured number of resource blocks per PRG.
26. The method of clause 24 or 25, wherein, responsive to the UE lacking the capability of maintaining frequency coherence for the non-contiguous downlink sub-bands, each sub-band is configured to include an integer number of resource blocks of pre-coding resource block groups (PRGs).
27. The method of any one of clauses 1 to 26, wherein, responsive to the at least one filter being adaptively switchable between the first configuration and the second configuration, based on a rule each pre-coding resource block group (PRG) is configured to avoid crossing two downlink sub-bands.
28. A user equipment (UE) comprising:
a memory storing instructions; and
at least one processor coupled with the memory and configured to execute the instructions to:

transmit at least one capability signal to a network entity, wherein the at least one capability signal indicates whether at least one filter in at least one receive chain of the UE is adaptively switchable between a first configuration and a second configuration, wherein the first configuration supports half-duplex communication with the network entity, wherein the second configuration supports sub-band full duplex communication with the network entity; and exchange a signal between the UE and the network entity according to the at least one capability signal.

28-1. The UE of clause 28, wherein the at least one processor is further configured to execute the instructions to perform the method of any one of clauses 2 to 27.

28-2. An apparatus comprising means for performing the method of any one of clauses 1 to 27.

28-3. A computer-readable medium storing instructions that, when executed by a processor, cause the processor to perform the method of any one of clauses 1 to 27.

29. A method of wireless communication by a network entity, comprising:

receiving at least one capability signal from a user equipment (UE), wherein the at least one capability signal indicates whether at least one filter in at least one receive chain of the UE is adaptively switchable between a first configuration and a second configuration, wherein the first configuration supports half-duplex communication with the UE, wherein the second configuration supports sub-band full duplex communication with the UE; and exchanging a signal between the UE and the network entity according to the at least one capability signal.

30. The method of clause 29, wherein the at least one capability signal further indicates a latency of the at least one filter in switching between the first configuration and the second configuration.

31. The method of clause 30, wherein the at least one capability signal comprises a first capability signal and a second capability signal, wherein the first capability signal indicates whether the at least one filter is adaptively switchable, wherein the second capability signal indicates the latency.

32. The method of clause 30, wherein the at least one capability signal comprises a single capability signal that indicates both the latency and whether the at least one filter is adaptively switchable.

33. The method of any one of clauses 29 to 32, wherein a first receive chain of the UE is configurable for reception in a first downlink sub-band, wherein a second receive chain of the UE is configurable for reception in a second downlink sub-band different from the first downlink sub-band, wherein the at least one capability signal indicates that a first wideband analog baseband filter in the first receive chain of the UE is adaptively switchable with a first analog baseband filter corresponding to the first downlink sub-band, and a second wideband analog baseband filter in the second receive chain of the UE is adaptively switchable with a second analog baseband filter corresponding to the second downlink sub-band.

34. The method of clause 33, wherein each one of the first analog baseband filter and the second analog baseband filter comprises an analog low pass filter.

35. The method of any one of clauses 29 to 34, wherein a receive chain of the UE is configurable for reception in both a first downlink sub-band and a second downlink sub-band different from the first downlink sub-band, wherein the at least one capability signal indicates that an analog baseband filter in the receive chain of the UE is adaptively switchable between the first configuration and the second configuration.

36. The method of clause 35, wherein the analog baseband filter comprises a first pass band and a second pass band spaced apart from the first pass band, wherein the first pass band corresponds to the first downlink sub-band, wherein the second pass band corresponds to the second downlink sub-band.

37. The method of any one of clauses 29 to 36, wherein a receive chain of the UE is configurable for reception in a downlink sub-band, wherein the at least one capability signal indicates that a wideband analog baseband filter in the receive chain of the UE is adaptively switchable with a reduced bandwidth analog baseband filter.

38. The method of any one of clauses 29 to 37, wherein a first receive chain of the UE is configurable for reception in a first downlink sub-band, wherein a second receive chain of the UE is configurable for reception in a second downlink sub-band different from the first downlink sub-band, wherein the at least one capability signal indicates that a first wideband digital baseband filter in the first receive chain of the UE is adaptively switchable with a first digital baseband filter corresponding to the first downlink sub-band, and a second wideband digital baseband filter in the second receive chain of the UE is adaptively switchable with a second digital baseband filter corresponding to the second downlink sub-band.

39. The method of any one of clauses 29 to 38, wherein a receive chain of the UE is configurable for reception in both a first downlink sub-band and a second downlink sub-band different from the first downlink sub-band, wherein the at least one capability signal indicates that a digital filter in the receive chain of the UE is adaptively switchable between the first configuration and the second configuration.

40. The method of any one of clauses 29 to 39, wherein a receive chain of the UE is configurable for reception in a downlink sub-band, wherein the at least one capability signal indicates that a wideband digital baseband filter in the receive chain of the UE is adaptively switchable with a reduced bandwidth digital baseband filter.

41. The method of any one of clauses 29 to 40, wherein the at least one capability signal further indicates whether a bandwidth of at least one further filter in at least one transmit chain of the UE is adaptively configurable to support either the sub-band full duplex communication or the half-duplex communication with the network entity.

42. The method of any one of clauses 29 to 41, wherein the at least one capability signal further indicates whether the UE has a capability of providing one or more options for receiving a frequency division multiplexed (FDMed) signal on one or more downlink sub-bands.

43. The method of clause 42, wherein the FDMed signal comprises a physical downlink shared channel (PDSCH), a physical downlink control channel (PDCCH), or a channel state information reference signal (CSI-RS).

44. The method of clause 41 or 42, wherein the at least one capability signal further indicates whether a configuration of the UE is dynamically switchable between at least two of the one or more options.

45. The method of any one of clauses 42 to 44, wherein the one or more options include a first option for supporting joint decoding/reception of the FDMed signal on two downlink sub-bands.

46. The method of any one of clauses 42 to 45, wherein the one or more options include a second option for supporting reception of the FDMed signal on a single downlink sub-band at a given time, wherein the single downlink sub-band is switchable between two downlink sub-bands at different times.

47. The method of any one of clauses 42 to 46, wherein the one or more options include a third option for supporting reception of the FDMed signal on only one fixed downlink sub-band.

48. The method of any one of clauses 42 to 47, wherein the UE comprises two decoder chains, wherein the one or more options include a fourth option for supporting simultaneous and separate reception of the FDMed signal on two downlink sub-bands.

49. The method of any one of clauses 29 to 48, wherein the at least one capability signal further indicates whether the UE has a capability of maintaining phase coherence for repetition combining or joint channel estimation across sub-band full duplex and time division duplexing (TDD)/half duplex symbols or slots.

50. The method of any one of clauses 29 to 49, wherein, responsive to the at least one capability signal indicating that the at least one filter is adaptively switchable between the first configuration and the second configuration, based on a rule the UE is not expected to maintain phase coherence for repetition combining or joint channel estimation across sub-band full duplex and time division duplexing (TDD)/half duplex symbols or slots.

51. The method of any one of clauses 29 to 50, wherein, responsive to the at least one capability signal indicating that the at least one filter is adaptively switchable between the first configuration and the second configuration, based on a rule the UE avoids joint channel estimation or demodulation reference signal (DMRS) bounding across sub-band full duplex and time division duplexing (TDD)/half duplex symbols or slots.

52. The method of any one of clauses 29 to 51, wherein, responsive to the at least one filter being adaptively switchable between the first configuration and the second configuration, the at least one capability signal further indicates whether the UE has a capability of maintaining frequency coherence for non-contiguous downlink sub-bands.

53. The method of clause 52, further comprising, responsive to the UE lacking the capability of maintaining frequency coherence for the non-contiguous downlink sub-bands, using one or more remaining resource blocks in a sub-band as one pre-coding resource block group (PRG) for precoding, irrespective of whether or not a quantity of the one or more remaining resource blocks is less than a radio resource control (RRC) configured number of resource blocks per PRG.

54. The method of clause 52 or 53, wherein, responsive to the UE lacking the capability of maintaining frequency coherence for the non-contiguous downlink sub-bands, each sub-band is configured to include an integer number of resource blocks of pre-coding resource block groups (PRGs).

55. The method of any one of clauses 29 to 54, wherein, responsive to the at least one filter being adaptively switchable between the first configuration and the second configuration, based on a rule each pre-coding resource block group (PRG) is configured to avoid crossing two downlink sub-bands.

56. A network entity comprising:
a memory storing instructions; and
at least one processor coupled with the memory and configured to execute the instructions to:
receive at least one capability signal from a user equipment (UE), wherein the at least one capability signal indicates whether at least one filter in at least one receive chain of the UE is adaptively switchable between a first configuration and a second configuration, wherein the first configuration supports half-duplex communication with the UE, wherein the second configuration supports sub-band full duplex communication with the UE; and
exchange a signal between the UE and the network entity according to the at least one capability signal.

56-1. The network entity of clause 56, wherein the at least one processor is further configured to execute the instructions to perform the method of any one of clauses 30 to 55.

56-2. An apparatus comprising means for performing the method of any one of clauses 29 to 55.

56-3. A computer-readable medium storing instructions that, when executed by a processor, cause the processor to perform the method of any one of clauses 29 to 55.

57. A method of wireless communication by a user equipment (UE), comprising: transmitting at least one capability signal to a network entity, wherein the at least one capability signal indicates whether the UE has a capability of providing one or more options for receiving a frequency division multiplexed (FDMed) signal on one or more downlink sub-bands; and
exchanging a signal between the UE and the network entity according to the at least one capability signal.

58. A method of wireless communication by a user equipment (UE), comprising: transmitting at least one capability signal to a network entity, wherein the at least one capability signal indicates whether the UE has a capability of maintaining phase coherence for repetition combining or joint channel estimation across sub-band full duplex and time division duplexing (TDD)/half duplex symbols or slots; and
exchanging a signal between the UE and the network entity according to the at least one capability signal.

59. A method of wireless communication by a user equipment (UE), comprising:
determining that at least one filter in at least one receive chain of the UE is adaptively switchable between a first configuration and a second configuration, wherein the first configuration supports half-duplex communication with a network entity, wherein the second configuration supports sub-band full duplex communication with the network entity;
wherein, responsive to the at least one filter being adaptively switchable between the first configuration and the second configuration, based on a rule the UE is not expected to maintain phase coherence for repetition combining or joint channel estimation across sub-band full duplex and time division duplexing (TDD)/half duplex symbols or slots; and
exchanging a signal between the UE and the network entity according to the rule.

60. A method of wireless communication by a user equipment (UE), comprising: determining that at least one filter in at least one receive chain of the UE is adaptively switchable between a first configuration and a second configuration, wherein the first configuration supports half-duplex communication with a network entity, wherein the second configuration supports sub-band full duplex communication with the network entity; and avoiding joint channel estimation or demodulation reference signal (DMRS) bounding across sub-band full duplex and time division duplexing (TDD)/half duplex symbols or slots, responsive to the at least one filter being adaptively switchable between the first configuration and the second configuration.

61. A method of wireless communication by a user equipment (UE), comprising:

determining that at least one filter in at least one receive chain of the UE is adaptively switchable between a first configuration and a second configuration, wherein the first configuration supports half-duplex communication with a network entity, wherein the second configuration supports sub-band full duplex communication with the network entity; and transmitting, responsive to the at least one filter being adaptively switchable between the first configuration and the second configuration, at least one capability signal by the UE to the network entity, wherein the at least one capability signal indicates whether the UE has a capability of maintaining frequency coherence for non-contiguous downlink sub-bands.

62. A method of wireless communication by a user equipment (UE), comprising:

determining that at least one filter in at least one receive chain of the UE is adaptively switchable between a first configuration and a second configuration, wherein the first configuration supports half-duplex communication with a network entity, wherein the second configuration supports sub-band full duplex communication with the network entity; and receiving one or more pre-coding resource block groups (PRGs) from the network entity, wherein, responsive to the at least one filter being adaptively switchable between the first configuration and the second configuration, each of the one or more PRGs is configured to avoid crossing two downlink sub-bands.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:

transmitting at least one capability signal to a network entity, wherein the at least one capability signal indicates whether at least one baseband filter in at least one receive chain of the UE is adaptively switchable between a first configuration and a second configuration, wherein the first configuration supports half-duplex communication with the network entity, wherein the second configuration supports sub-band full duplex communication with the network entity; and receiving a downlink (DL) signal from the network entity according to the at least one capability signal.

2. The method of claim 1, wherein the at least one capability signal further indicates a latency of the at least one baseband filter in switching between the first configuration and the second configuration.

3. The method of claim 2, wherein the at least one capability signal comprises a first capability signal and a second capability signal, wherein the first capability signal indicates whether the at least one baseband filter is adaptively switchable, wherein the second capability signal indicates the latency.

4. The method of claim 2, wherein the at least one capability signal comprises a single capability signal that indicates both the latency and whether the at least one baseband filter is adaptively switchable.

5. The method of claim 1, wherein the at least one receive chain includes a first receive chain and a second receive chain, wherein the first receive chain of the UE is configurable for reception in a first downlink sub-band, wherein the second receive chain of the UE is configurable for reception in a second downlink sub-band different from the first downlink sub-band, wherein the at least one capability signal indicates that a first wideband analog baseband filter in the first receive chain of the UE is adaptively switchable with a first analog baseband filter corresponding to the first downlink sub-band, and a second wideband analog baseband filter in the second receive chain of the UE is adaptively switchable with a second analog baseband filter corresponding to the second downlink sub-band.

6. The method of claim 5, wherein each one of the first analog baseband filter and the second analog baseband filter comprises an analog low pass filter.

7. The method of claim 1, wherein a receive chain of the at least one receive chain of the UE is configurable for reception in both a first downlink sub-band and a second downlink sub-band different from the first downlink sub-band, wherein the at least one capability signal indicates that an analog baseband filter in the receive chain of the UE is adaptively switchable between the first configuration and the second configuration.

8. The method of claim 7, wherein the analog baseband filter comprises a first pass band and a second pass band spaced apart from the first pass band, wherein the first pass band corresponds to the first downlink sub-band, wherein the second pass band corresponds to the second downlink sub-band.

9. The method of claim 1, wherein a receive chain of the at least one receive chain of the UE is configurable for reception in a downlink sub-band, wherein the at least one capability signal indicates that a wideband analog baseband filter in the receive chain of the UE is adaptively switchable with a reduced bandwidth analog baseband filter.

10. The method of claim 1, wherein the at least one receive chain includes a first receive chain and a second receive chain, wherein the first receive chain of the UE is configurable for reception in a first downlink sub-band, wherein the second receive chain of the UE is configurable for reception in a second downlink sub-band different from the first downlink sub-band, wherein the at least one capability signal indicates that a first wideband digital baseband filter in the first receive chain of the UE is adaptively switchable with a first digital baseband filter corresponding to the first downlink sub-band, and a second wideband digital baseband filter in the second receive chain of the UE is adaptively switchable with a second digital baseband filter corresponding to the second downlink sub-band.

11. The method of claim 1, wherein a receive chain of the at least one receive chain of the UE is configurable for reception in both a first downlink sub-band and a second downlink sub-band different from the first downlink sub-band, wherein the at least one capability signal indicates that a digital filter in the receive chain of the UE is adaptively switchable between the first configuration and the second configuration.

12. The method of claim 1, wherein a receive chain of the at least one receive chain of the UE is configurable for reception in a downlink sub-band, wherein the at least one capability signal indicates that a wideband digital baseband filter in the receive chain of the UE is adaptively switchable with a reduced bandwidth digital baseband filter.

13. The method of claim 1, wherein the at least one capability signal further indicates whether a bandwidth of at least one further baseband filter in at least one transmit chain of the UE is adaptively configurable to support either the sub-band full duplex communication or the half-duplex communication with the network entity.

14. The method of claim 1, wherein the at least one capability signal further indicates whether the UE has a capability of providing one or more options for receiving a frequency division multiplexed (FDMed) signal on one or more downlink sub-bands.

15. The method of claim 14, wherein the FDMed signal comprises a physical downlink shared channel (PDSCH), a physical downlink control channel (PDCCH), or a channel state information reference signal (CSI-RS).

16. The method of claim 14, wherein the at least one capability signal further indicates whether a configuration of the UE is dynamically switchable between at least two of the one or more options.

17. The method of claim 14, wherein the one or more options include a first option for supporting joint decoding/reception of the FDMed signal on two downlink sub-bands.

18. The method of claim 14, wherein the one or more options include a second option for supporting reception of the FDMed signal on a single downlink sub-band at a given time, wherein the single downlink sub-band is switchable between two downlink sub-bands at different times.

19. The method of claim 14, wherein the one or more options include a third option for supporting reception of the FDMed signal on only one fixed downlink sub-band.

20. The method of claim 14, wherein the UE comprises two decoder chains, wherein the one or more options include a fourth option for supporting simultaneous and separate reception of the FDMed signal on two downlink sub-bands.

21. The method of claim 1, wherein the at least one capability signal further indicates whether the UE has a capability of maintaining phase coherence for repetition combining or joint channel estimation across sub-band full duplex and time division duplexing (TDD)/half duplex symbols or slots.

22. The method of claim 1, wherein, responsive to the at least one capability signal indicating that the at least one baseband filter is adaptively switchable between the first configuration and the second configuration or based on a rule, the UE is not expected to maintain phase coherence for repetition combining or joint channel estimation across sub-band full duplex and time division duplexing (TDD)/half duplex symbols or slots.

23. The method of claim 1, wherein, responsive to the at least one capability signal indicating that the at least one baseband filter is adaptively switchable between the first configuration and the second configuration or based on a rule, the UE avoids joint channel estimation or demodulation reference signal (DMRS) bounding across sub-band full duplex and time division duplexing (TDD)/half duplex symbols or slots.

24. The method of claim 1, wherein, responsive to the at least one baseband filter being adaptively switchable between the first configuration and the second configuration, the at least one capability signal further indicates whether the UE has a capability of maintaining frequency coherence for non-contiguous downlink sub-bands.

25. The method of claim 24, further comprising, responsive to the UE lacking the capability of maintaining frequency coherence for the non-contiguous downlink sub-bands, using one or more remaining resource blocks in a sub-band as one pre-coding resource block group (PRG) for precoding, irrespective of whether or not a quantity of the one or more remaining resource blocks is less than a radio resource control (RRC) configured number of resource blocks per PRG.

26. The method of claim 24, wherein, responsive to the UE lacking the capability of maintaining frequency coherence for the non-contiguous downlink sub-bands, each sub-band is configured to include an integer number of resource blocks of pre-coding resource block groups (PRGs).

27. The method of claim 1, wherein, responsive to the at least one baseband filter being adaptively switchable between the first configuration and the second configuration or based on a rule, each pre-coding resource block group (PRG) is configured to avoid crossing two downlink sub-bands.

28. A user equipment (UE) comprising:
a memory storing instructions; and
at least one processor coupled with the memory and configured to execute the instructions to:
transmit at least one capability signal to a network entity, wherein the at least one capability signal indicates whether at least one baseband filter in at least one receive chain of the UE is adaptively switchable between a first configuration and a second configuration, wherein the first configuration supports half-duplex communication with the network entity, wherein the second configuration supports sub-band full duplex communication with the network entity; and
receive a downlink (DL) signal from the network entity according to the at least one capability signal.

29. A method of wireless communication by a network entity, comprising:
receiving at least one capability signal from a user equipment (UE), wherein the at least one capability signal indicates whether at least one baseband filter in at least one receive chain of the UE is adaptively switchable between a first configuration and a second configuration, wherein the first configuration supports half-duplex communication with the UE, wherein the second configuration supports sub-band full duplex communication with the UE; and
transmitting a downlink (DL) signal to the UE according to the at least one capability signal.

30. A network entity comprising:
a memory storing instructions; and
at least one processor coupled with the memory and configured to execute the instructions to:
receive at least one capability signal from a user equipment (UE), wherein the at least one capability signal indicates whether at least one baseband filter in at least one receive chain of the UE is adaptively switchable between a first configuration and a second configuration, wherein the first configuration supports half-duplex communication with the UE, wherein the second configuration supports sub-band full duplex communication with the UE; and
transmit a downlink (DL) signal to the UE according to the at least one capability signal.

* * * * *